(12) United States Patent
Leininger

(10) Patent No.: US 7,705,482 B2
(45) Date of Patent: Apr. 27, 2010

(54) TOOL HAVING INTEGRATED ELECTRICITY GENERATOR WITH EXTERNAL STATOR

(75) Inventor: Jon J. Leininger, Wilson, NY (US)

(73) Assignee: H&S Autoshot Mfg. Co. Ltd.

( * ) Notice: Subject to any disclaimer, the term of this patent is extended or adjusted under 35 U.S.C. 154(b) by 0 days.

(21) Appl. No.: 11/902,384

(22) Filed: Sep. 21, 2007

(65) Prior Publication Data

US 2008/0122302 A1   May 29, 2008

Related U.S. Application Data

(60) Provisional application No. 60/855,124, filed on Oct. 30, 2006.

(51) Int. Cl.
*F03R 13/00* (2006.01)
(52) U.S. Cl. .................. 290/55; 290/54; 290/44
(58) Field of Classification Search ............ 290/55
See application file for complete search history.

(56) References Cited

U.S. PATENT DOCUMENTS

| | | | |
|---|---|---|---|
| 2,390,130 A * | 12/1945 | Sigmund et al. ............ 310/54 |
| 3,731,384 A * | 5/1973 | Brooks et al. ............... 433/32 |
| 4,227,105 A * | 10/1980 | Kumakura .................. 310/153 |
| 4,354,126 A * | 10/1982 | Yates ....................... 310/156.59 |
| 4,678,922 A | 7/1987 | Leininger |
| 4,801,834 A * | 1/1989 | Stokes .................... 310/156.12 |
| 4,805,404 A * | 2/1989 | Dupin ......................... 60/409 |
| 5,095,238 A * | 3/1992 | Suzuki et al. .......... 310/156.46 |
| 5,267,129 A * | 11/1993 | Anderson .................... 362/96 |
| 5,525,842 A | 6/1996 | Leininger |
| 5,801,454 A * | 9/1998 | Leininger ..................... 290/54 |
| 5,998,902 A * | 12/1999 | Sleder et al. .................. 310/153 |
| 6,011,334 A * | 1/2000 | Roland ......................... 310/86 |
| 6,397,946 B1 * | 6/2002 | Vail, III ................... 166/250.01 |
| 6,552,461 B2 * | 4/2003 | Takahata et al. ........ 310/156.53 |
| 6,838,798 B2 * | 1/2005 | Takahata et al. ........ 310/156.53 |
| 6,911,756 B1 * | 6/2005 | Chang .................... 310/156.01 |
| 6,933,645 B1 * | 8/2005 | Watson .................. 310/156.09 |
| 7,088,024 B2 * | 8/2006 | Agnes et al. ........... 310/154.12 |
| 7,095,142 B2 | 8/2006 | Leininger |
| 2003/0234591 A1 | 12/2003 | Smith |
| 2005/0258694 A1 * | 11/2005 | Leininger .............. 310/156.32 |
| 2006/0028083 A1 * | 2/2006 | Costin et al. ............ 310/156.55 |
| 2006/0082238 A1 | 4/2006 | Kusase et al. |
| 2007/0024141 A1 * | 2/2007 | Drexlmaier ............. 310/156.19 |
| 2007/0290558 A1 * | 12/2007 | Leininger ..................... 310/71 |
| 2008/0176181 A1 * | 7/2008 | Putz et al. ..................... 433/29 |
| 2008/0197718 A1 * | 8/2008 | Wohner ........................ 310/11 |

FOREIGN PATENT DOCUMENTS

| | | |
|---|---|---|
| FR | 2523891 A * | 9/1983 |
| JP | 11033037 A * | 2/1999 |
| JP | 2001178037 A * | 6/2001 |

OTHER PUBLICATIONS

Canadian Office Action corresponding to Canadian Patent Application No. 2,600,644.

* cited by examiner

*Primary Examiner*—Joseph Waks

(57) ABSTRACT

A tool includes a nonmagnetic tool housing; a cylindrical rotor inside the tool housing and rotatable in response to a flow of pressurized fluid through the tool housing; magnets mounted in the rotor; and a stator on the exterior of the tool housing. The stator is dimensioned to cooperate with the magnets to, upon rotation of the rotor, generate electrical current for supply to a load.

24 Claims, 13 Drawing Sheets

TOOL HAVING INTEGRATED ELECTRICITY GENERATOR WITH EXTERNAL STATOR

REFERENCE TO RELATED APPLICATION

This application claims priority under 35 U.S.C. 119(e) from U.S. Provisional Patent Application No. 60/855,124 filed Oct. 30, 2006.

FIELD OF THE INVENTION

The following relates generally to pneumatic tools with integrated electricity generators and more particularly to an integrated electricity generator for a pneumatic tool with a stator that is positioned on the outside of the pneumatic tool housing.

BACKGROUND OF THE INVENTION

Conventional pneumatic tools, such as a pneumatic wrench, sander or grinder typically include a fluid driven motor comprised of a rotor having sliding vanes and mounted for rotation on ball bearings enclosed within a pressure-tight tool housing. The ball bearings are supported by front and rear end plates positioned on each end of a motor cylinder having an offset annular bore, relative to its external diameter and running parallel to the cylinder length. The rotor runs longitudinally through offset annular bore of the cylinder, in non-concentric alignment with an internal wall and concentric alignment with the external wall thereof, to provide a chamber internal to the cylinder bore along the length of one side of the rotor for receiving pressurized fluid, such as compressed air, entering from an inlet port leading into the chamber. The pneumatic tool housing is a pressure-tight casing alternatively referred to as a motor housing.

Lengthwise slots in a number of equidistant locations about the circumference of the rotor for receiving the vanes are known as rotary vane slots. The rotary vane slots each support a phenolic (or plastic) vane that radially slides within the slots as the rotor rotates, thereby enabling consistent contact of the outer edges of the vanes with the internal wall of the chamber. In combination with lubricating oil, when the rotor is rotating due to a flow of pressurized fluid, the sliding vanes act as rotating "seals" forming a boundary in the pressurized chamber at the union of the vanes planar surface areas with rotor slot walls and vane outer edges with cylinder wall as vanes enter and exit the pressurized chambered area. Sometimes vanes are biased radially outward in the rotor slots to maintain contact with the cylinder wall by spring tension. Springs are provided between the base of the slot and air-vane to maintain a sealed chamber upon startup, thereby so eliminating cogging or stalling prior to inertial momentum. Each time a vane enters the chamber, it receives pneumatic force upon a high-pressure side of its extended planar surface, due to a flow of pressurized fluid that is entering behind it from an adjacent inlet port usually situated on the circumferential edge of the motor cylinder at the start of the chambered area. The inlet port communicates with an inlet passage and valve body in the tool housing. The high-pressure fluid passes through the cylinder walls, surmounting mechanical resistance at the air vanes in the chambered area, to reach a low-pressure state at exhaust ports in the cylinder wall. The exhaust ports are generally located beyond a specified degree of arc from the inlet of the pressurized chamber, thereby causing the rotor to forcibly rotate in a direction from the pressurized inlet towards exhaust ports within the motor cylinder and tool housing. A pinion on the rotor's shaft transmits rotational force to a planetary gear set to provide useful torque conversion from high-speed rotation at the working end of the tool. Some pneumatic tools make use of gearing in order to transmit the rotational force to the working end of the tool, while others do so simply by employing a threaded shaft and a collet, or other means appropriate to the primary application of the tool.

U.S. Pat. No. 4,678,922 (Leininger), the contents of which are incorporated by reference in its entirety herein, discloses an apparatus for generating electricity using the flow of pressurized fluid such as air in a pneumatic tool by way of a magnetic coupling between a specially designed rotor and a stator. Magnetic means are affixed to the tool rotor, and thereby cooperate during rotation with a stator mounted in the tool housing, motor cylinder or bearing end plate(s) to induce electrical current in the coils of the stator. The '922 disclosure thus provides an integrated, self-contained and self-powered lighting source for illuminating a workpiece upon which the pneumatic tool is working. Various improvements have been made to integrated electricity generators in order to improve their electrical output, longevity, usability, efficiency, cost and manufacturability, and to reduce their size. Examples of such improvements may be found in U.S. Pat. Nos. 5,525,842 and 7,095,142 (both to Leininger), each incorporated by reference in its entirety herein, in which various configurations of rotor, stator, power distribution and light source are provided.

While the contributions of the above-mentioned references are significant, improvements are of course desired. For example, both the rotor and stator of prior art integrated electricity generators are inside the tool housing such that they are exposed to the compressed air and fluids containing lubricating oil mixed with moisture in the pressurized air stream flowing therethrough. The stator and particularly the coil winding therefore have to be potted or otherwise specially treated in order to protect sensitive electrical components. Furthermore, each device to which the generated electricity is supplied (i.e., incandescent lamps, light emitting diode (LED), active RFID tags and other electronic devices etc.) is typically employed by, or presents a user interface external to, the tool housing. Electrical lead wires conducting current from a stator must therefore pass from the pressurized interior of the tool housing, typically at 90 to 100+ pounds-per-inch$^2$ (psi) during operation, to exterior zones typically at normal atmospheric pressure of zero psi, via feed-through conduits. To prevent leaks of pressurized fluid, an additional manufacturing step is typically necessary to provide hermetic sealing around the feed-through conduits. Additionally, during tool assembly and service a labor-intensive procedure is needed to resolve the physical placement of lead wires through a motor bore, tool housing and feed-through conduit from an internal stator.

Furthermore, it is an electronic challenge to provide a secure, vibration damped environment for mounting printed circuit boards containing sensitive integrated circuit (IC) components and sensors, whether on a metallic bodied tool surface or in a cavity thereon, while also providing a nonconductive and static-free and dry environment. Experience in the art teaches that pneumatic motor resonations can produce deleterious effects on some electronic components hard-mounted onto the tool housing.

It is an object of an aspect of the following to provide a novel integrated electricity generator for a pneumatic tool having a stator that is positioned external to the pneumatic tool housing.

SUMMARY OF THE INVENTION

According to an aspect, there is provided a tool comprising:
- a nonmagnetic tool housing;
- a cylindrical rotor inside the tool housing and rotatable in response to a flow of pressurized fluid through the tool housing;
- magnets mounted in the rotor;
- a stator on the exterior of the tool housing, the stator dimensioned to cooperate with the magnets to, upon rotation of the rotor, generate electrical current for supply to a load.

According to another aspect, there is provided an electricity generator for integration with a tool, the electricity generator comprising:
- a rotor rotatably mounted within a tool housing of the tool such that the rotor rotates in response to a flow of pressurized fluid through the tool;
- magnets mounted generally uniformly in respective nonmagnetic portions of the rotor;
- a stator on the exterior of the tool housing comprising an inductor core and a coil mounted on the inductor core, the stator dimensioned to cooperate with the magnets mounted in the rotor to, upon rotation, generate electricity for supply to a load.

According to another aspect, there is provided a rotor for an integrated electricity generator of a tool, the rotor comprising:
- a shaft rotatably mounted within a tool housing of the tool;
- a nonmagnetic rotor body integral with the shaft and having a plurality of grooves uniformly spaced therein, each of the grooves dimensioned to receive a corresponding magnet;
- vanes on the rotor body for receiving thereon a flow of pressurized fluid passing through the tool housing and thereby causing the rotor to rotate;
- wherein each of the grooves is positioned on the rotor body to, when a corresponding magnet is received therein, enable the magnet to cooperate, upon rotation of the rotor within the tool housing, with an arced stator portion of the integrated electricity generator that is on the exterior of the tool housing to generate electrical current in the stator portion.

According to another aspect, there is provided a stator for cooperating with a rotor disposed within a tool housing of an integrated electricity generator of a tool, the stator comprising:
- an arced inductor core;
- a coil wound around the inductor core and having leads for supplying current to a load external to the tool housing;
- wherein the stator is configured to be disposed on the exterior of the tool housing.

According to another aspect, there is provided a magnet for receipt by a rotor that is disposed within a tool housing of a tool having an integrated electricity generator, the magnet dimensioned to be retained within a respective dovetail groove in a rotor body of the rotor.

According to another aspect, there is provided a rotor assembly for cooperating with a stator of an integrated electricity generator in a tool, the rotor assembly comprising:
- an elongate shaft comprising means for rotatably mounting said rotor in said tool;
- a nonmagnetic rotor body integral with said shaft, said rotor body having a plurality of slots uniformly spaced about its circumference;
- a plurality of vanes, each vane received within a respective one of the slots and incorporating elongated magnets;
- whereupon rotation of the rotor assembly, the elongated magnets cooperate with the stator on the exterior of the tool housing to generate electrical current within the external stator.

According to another aspect, there is provided a rotor assembly for cooperating with a stator in an integrated electricity generator in a tool, the rotor assembly comprising:
- an elongate shaft comprising means for rotatably mounting said rotor in said tool;
- a rotor body integral with said shaft, said rotor body having a plurality of slots uniformly spaced about its circumference;
- a plurality of vanes, each vane received within a respective one of the slots and comprising wear-resistant material and anisotropic powder of NdFeB;
- whereupon rotation of the rotor assembly, the elongated magnets cooperate with the stator to generate electrical current within the stator.

According to another aspect, there is provided a tool cover for receiving a tool housing of a tool, the tool cover supporting and aligning an inductor element of a stator with magnets of a rotor within the tool housing, the tool cover also supporting a circuit to which the inductor element is electrically connected.

According to another aspect, there is provided a tool comprising:
- a nonmagnetic tool housing;
- a generally cylindrical rotor inside the tool housing and rotatable in response to a flow of pressurized fluid through the tool housing, the rotor transmitting rotational force to a working end of the tool;
- magnets mounted generally uniformly about the circumference of the rotor;
- a stator on the exterior of the tool housing, the stator dimensioned to cooperate with the magnets to, upon rotation of the rotor, generate electrical current for supply to a load.

According to another aspect, there is provided a tool, comprising:
- a nonmagnetic tool housing;
- a stator on the exterior of the tool housing, the stator cooperating with magnets on a rotor within the tool housing to generate electricity in the stator when the rotor is caused to rotate in response to flow of pressurized fluid through the tool housing;
- wherein the rotor transmits rotational force to a working end of the tool.

According to another aspect, there is provided a cover for a tool, comprising:
- a body dimensioned to receive a tool housing of the tool and to permit access to an actuating lever on the tool housing;
- a stator in the body adjacent to the tool housing, the stator cooperating with magnets on a rotor within the tool housing to generate electricity in the stator when the rotor is caused to rotate in response to flow of pressurized fluid through the tool housing.

According to another aspect, there is provided a cover for a tool, comprising:
- a body dimensioned to receive a tool housing of the tool and to permit access to an actuating lever on the tool housing, the body having a surface area for receiving a flexible conductive substrate to form a printed circuit a cavity in the body adjacent to the tool housing, the cavity dimensioned to receive a stator;

wherein the stator is for cooperating with magnets on a rotor within the tool housing to generate electricity in the stator when the rotor is caused to rotate in response to flow of pressurized fluid through the tool housing.

According to another aspect, there is provided an electricity generator for a tool, the electricity generator comprising a rotor mounted within a tool housing of the tool such that the rotor rotates in response to a flow of pressurized fluid through the tool and transmits rotational force to a working end of the tool, the electricity generator comprising:

magnets mounted generally uniformly about the circumference of a nonmagnetic portion of the rotor;

a stator on the exterior of the tool housing cooperating with the magnets to, upon rotation, generate electricity for supply to a load.

According to another aspect, there is provided a tool comprising:

a tool housing;

a cylindrical rotor inside the tool housing transmitting mechanical force to a working end of the tool when caused to rotate by a flow of pressurized fluid through the tool housing;

magnets connected to the rotor;

a stator on the exterior of the tool housing producing electrical current in response to relative movement of the magnets thereto upon rotation of the rotor.

According to another aspect, there is provided a stator for an integrated electricity generator in a tool, the stator comprising:

an arced, I-shaped inductor core;

a coil of wire receiving the middle portion of the inductor core and operably connectable to a load.

According to another aspect, there is provided a safety system for a tool comprising:

an electricity generator integrated with the tool;

a wireless signal receiver powered by electricity generated by the generator and operably connected to an inlet valve of the tool;

a safety item wearable by a user of the tool transmitting a wireless signal when properly worn by the user;

wherein the wireless signal receiver closes the inlet valve to prevent operation of the tool in the event that the safety item is not being worn by the user.

The integrated electricity generator disclosed herein provides several advantages. In particular, it is not required to pass lead wires through feed-through conduits in order to generate electricity for use outside of the tool housing from the relative movement of the rotor and the stator. Furthermore, hermetic sealing previously required for feed-through conduits is not required. It will be understood that obviating the lead wires also obviates the related manufacturing steps necessary for their placement. Overall circuit resistance is also reduced, improving the operational electrical efficiency of power distribution to storage components, integrated circuits and LEDs. Because the tool cover is configured to support and align the inductor element and circuitry of the stator with respect to the rotor, construction of the pneumatic tool itself is further simplified. Yet another advantage is that the stator does not depend, rely on, or affect any of the engineered mechanical tolerances of existing air tool designs. Conversely speaking, the stator component dimensions are not governed by critical tolerances of the mechanical parts designed to drive a pressurized fluid driven tool efficiently. As compared to prior art methods directly involving modifications to motor parts and in particular, an end plate supporting a rotor, this approach does not constrict stator size (or output) to minimal air-motor volumes or to limits restricted by the size of internal motor elements. The degrees of freedom to designing an appropriate sized stator to fulfill a specific electronic objective are therefore increased, allowing design to a higher degree to be informed by the external boundary of the tool or what may otherwise be deemed commercially acceptable tool aesthetics.

Other aspects and advantages will become apparent from the details of construction and operation as more fully hereinafter described and claimed, reference being had to the accompanying drawings forming a part hereof.

BRIEF DESCRIPTION OF THE DRAWINGS

Embodiments will now be described more fully with reference to the accompanying drawings, in which.

DETAILED DESCRIPTION OF THE EMBODIMENTS

For the purpose of this specification, it will be clearly understood that the word "comprises" means "including but not limited to" and that the word "comprising" has an equivalent meaning.

Figure 1:
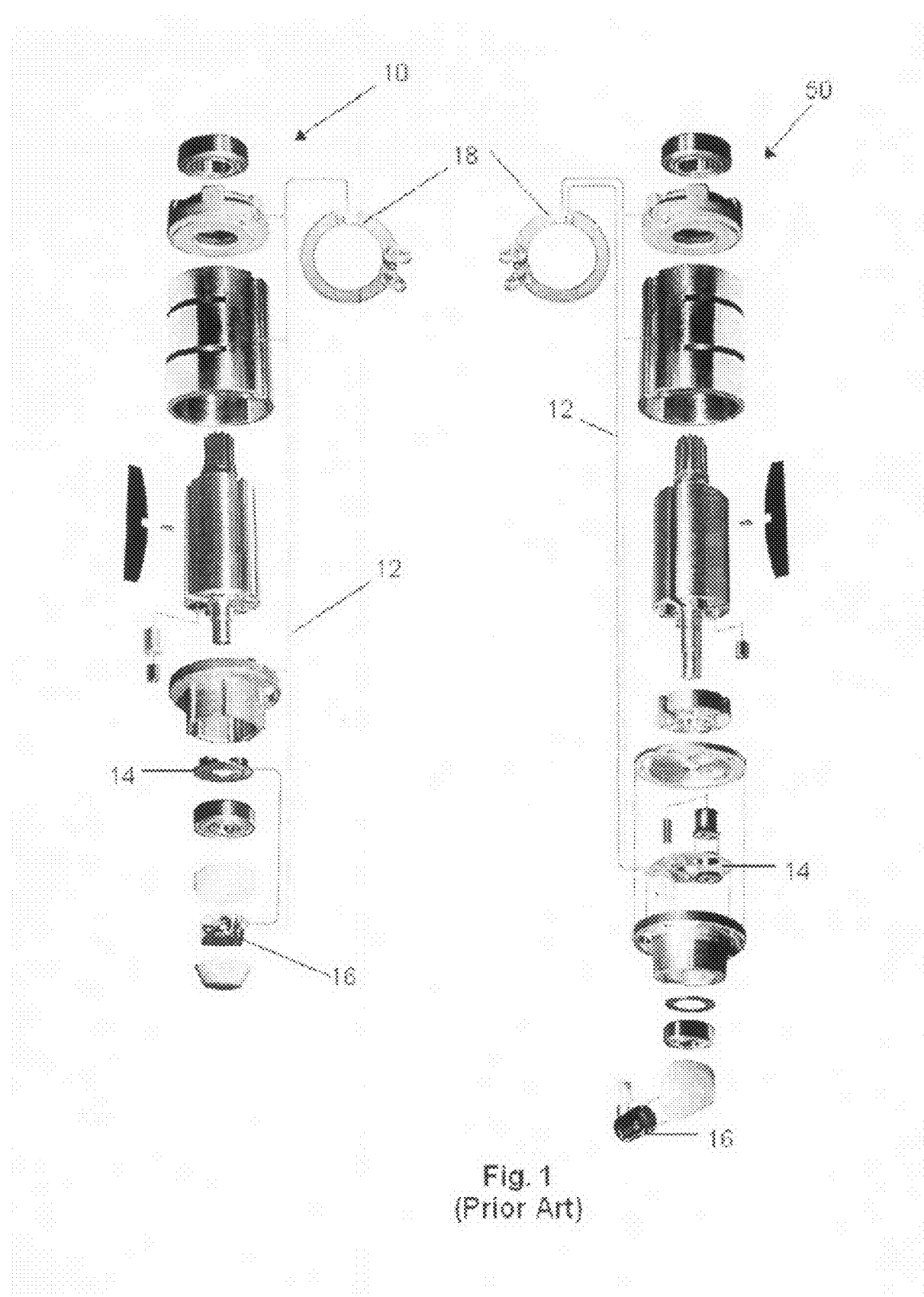
FIG. 1 is an exploded view of two pneumatic tools having integrated electricity generators, according to the prior art.

FIG. 1 shows exploded views of two prior art air-motor integrated electric generators and supporting components generally at 10 and 50. It can be seen that physical wires 12 are required to carry electrical current from the stator including the inductor 14 and supporting circuitry 16 that is positioned within the pressurized tool housing (not shown in FIG. 1) through to the low pressure exterior of the tool housing. The electrical current supplies respective light ring luminaire 18 for use outside of the tool housing to light the immediate surface area of a workpiece. The supporting circuitry of the stator is potted (epoxy encapsulated) to prevent interference of moisture and high-pressure air with its sensitive electrical components. Not shown in FIG. 1 but required in such prior art devices is hermetic sealing at feed-through conduits in the tool housing to prevent undue egress of high pressure air through the conduits.

Figure 2:
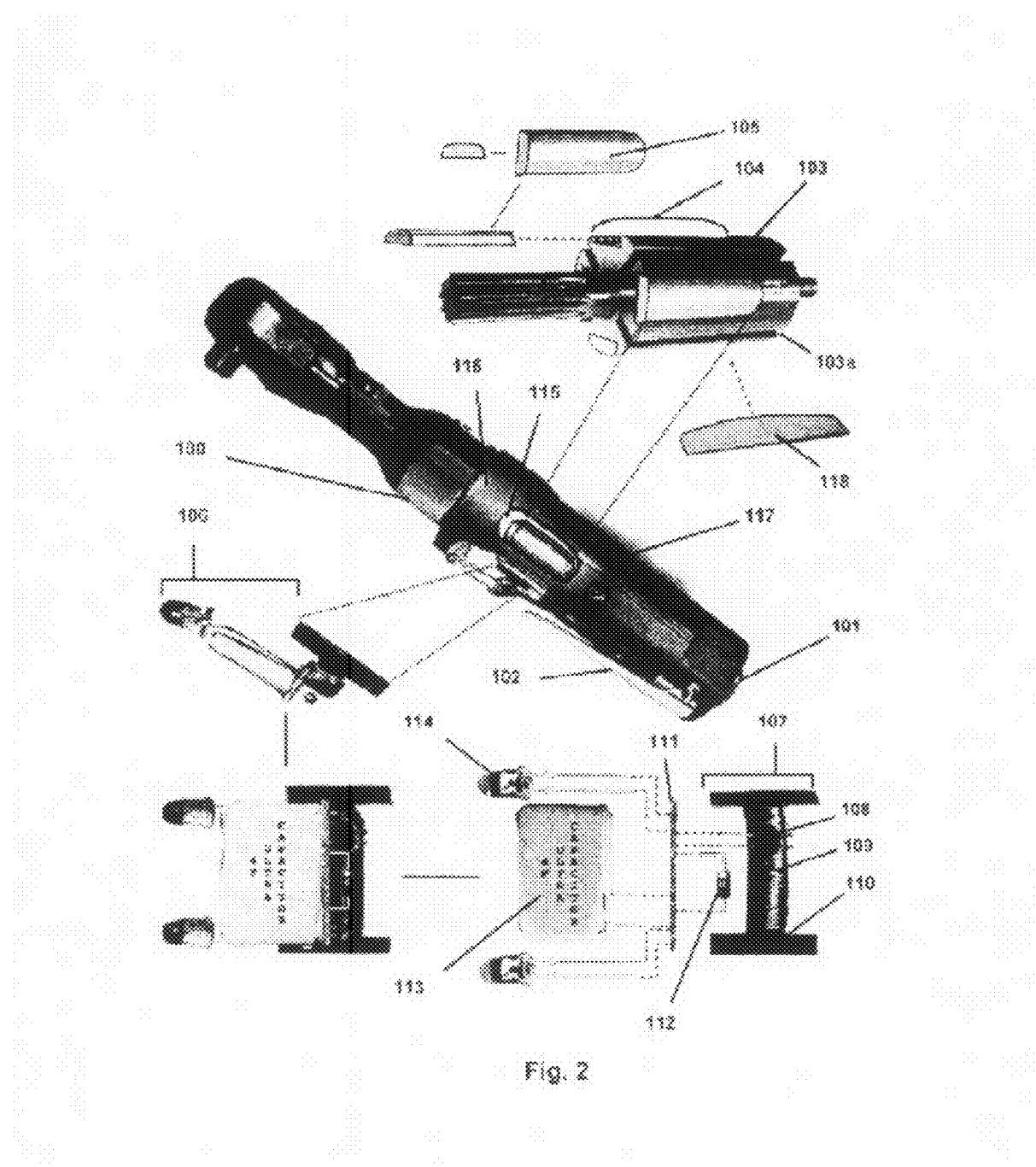
FIG. 2 is a view of a pneumatic tool having an integrated electricity generator with an external stator, with exploded and disassembled views of components thereof.

FIG. 2 shows the general configuration of a novel pneumatic tool in the form of an air ratchet wrench 100 incorporating an integrated electricity generator, according to an embodiment. Air ratchet wrench 100 includes an air inlet 101 to allow a pressurized fluid such as compressed air to enter inlet passages within its cast aluminum tool housing 115. Tool housing 115 has general dimensions of about 5.0 inches in length (L)×1.4 inches outside diameter (OD). Tool housing 115 has a generally concentric center-bore for receiving a cylindrically shaped pre-assembled air motor with said center-bore having dimensions of about 3.150 inches L×about 1.190 inches inside diameter (ID). An air inlet valve-actuating lever 102 enables a user to control a mechanically operated or alternative switchable solenoid inlet valve (not shown), and hence the flow of compressed air entering the tool housing via air inlet 101. A discrete high visibility lighted brand name, trade mark, logo, private user name or hazard warning label with supporting drive circuit, is mounted in a recessed area on the surface of a polyurethane (or other flexible material) or molded rigid plastic nonconductive tool cover 117 that receives aluminum tool housing 115.

The integrated electricity generator has a rotor 103 that is rotated upon application of compressed air via air inlet 101 and valve onto sliding vanes 118 slideably mounted in respective slots 103a of the rotor body. In the present embodiment, the rotor body of rotor 103 has general dimensions of about 1.494 inches L×about 0.806 inches OD. Rotor 103 also has a plurality of grooves 104 in a number of equidistant locations about its circumference (i.e., between vane slots 103a) to receive and retain respective magnets 105.

The integrated electricity generator also has a stator that comprises an inductor element 107 disposed on the outside of (i.e. on the opposite side of the tool housing from the rotor, or "external to") the tool housing 115 and physically supported by tool cover 117. Inductor element 107 includes a generally flat I-shaped inductor core 110 having an overall end-to-end dimension of about 1.304 inches with a thickness (T) of about 0.025 inch that is further curved lengthwise, or "arced" in the geometric sense. A coil 109 of magnet wire of either flat or round conductor of pure copper having an American Wire Gauge number of from 34 to 36 gauges is wound around inductor core 110. As can be seen, magnet wire of coil 109 is wrapped orthocyclically (even layers) to around 350 to 400 turns, around the central portion (space between opposing ends) of the inductor core 110. The dimension of the central portion of I-shaped core 110 is about 0.875 inch L×about 0.225 inch W. Each of the inductor ends of the I-shaped inductor core 110 has side-to-side (opposing ends of "I" areas perpendicular to the central core) dimensions of about 0.800 inch (corresponding to a rotor magnet length of 1.00 inch).

Inductor core 110 is made of die-stamped magnetically saturable electrical steel, such as Silicon Iron magnetic alloy used as core laminations in typical transformers, motors or alternators. If overall weight of a tool is to be kept to a minimum, inductor 110 can be alternatively formed from thinner laminations of high permeability aircraft grade Vanadium Cobalt alloy. The physical arc of inductor core 110 may be described as being about a circumference of an imaginary cylinder having a radius (R) of about 0.77 inch generally arced through 90 degrees of said radius. This inductor size will work for a pneumatic tool, the nonmagnetic housing of which has an outer diametrical dimension no greater than 1.4 inches in the radially adjacent circumference surrounding the rotor magnets (or magnetic field). The physical arc of inductor is generally coaxial with the axis of rotation of rotor 103. Ends of coil 109 are solder dipped to square-pin terminal type circuit board header pins 108 of about 0.025 inches so as to adapt to PC board through-hole mounting means of a printed circuit board 111.

Luminaire 106 receives current from conductive traces of printed circuit board 111 plane that are connected to header pins 108. Luminaire includes LEDs 114 and supporting circuitry including further a single rectifier diode 112 and an ultra-capacitor 113 storage means. Multiple LEDs 114 may be substituted with a single LED to provide 100-107 lumens at 350 mA, such as a CREE Xlamp 7090 XR-E Series LED (not shown), which is more than enough light for illuminating a workpiece during operation of the pneumatic tool in dimly lit work places.

Single rectifier diode 112 is a standard recovery axial lead rectifier diode such as a 1N4001, or a smaller surface mount equivalent ultra fast silicon rectifier such as US1A by Pan Ji. The single diode provides rectification to half-wave direct current (DC) from raw variable frequency input alternating current (AC) delivered directly by the stator coil 109. Half wave DC is known to be suitable for throughput to a storage capacitor 113, which smoothes the rectified current upon discharge to provide generally uniform DC to a load.

Alternatives to ultracapacitor 113 may include rechargeable battery such as a high energy density Nickel Metal Hydride (NiMH) or thin-cell Lithium Polymer (LiPo) battery as is well known in portable electronics applications. One newly emerging rechargeable battery that appears to be a likely substitute for a fast charging ultracapacitor is the ultra-thin, flexible, super fast charging, high power density and environmentally friendly device, known as an organic radical battery (ORB) announced and under development by NEC in 2005. Such a storage device could be integrated with inductor element 107 to form a magnetically reactive power charge-discharge source that would provide electricity for as long as the tool remained operative.

In general, capacitors that provide smooth operating parameters for illuminating a work surface, with high brightness white emitting LEDs, can range in value from a single Farad (F) through 4 F depending on the desired time constants for charging and discharging cycles. Commercially available 1 F Aerogel Series B capacitor by PowerStor will yield up to a minute of intense light using two 5 mm Nichia NSPW500BS LEDs, whereas a 4 F Maxwell Technologies PC5 will more than double the 1 F discharge period for these lamps. The generally uniform DC current is provided to a load, which according to this embodiment are light emitting diodes (LEDs) 114, used for illuminating a workpiece. More sophisticated tool related electronic hardware such as that which can provide digital torque calculation on fasteners embodied with an air powered wrench, that calls for computer or memory will require full wave bridge rectification to inputs in place of single diode 112 and higher energy density storage means to support prolonged operations in place of specified capacitors.

During operation of air ratchet wrench 100, rotor 103 rotates in response to application of pressurized air, causing magnets 105 to rotate within tool housing 115 relative to stationary inductor element 107 of the stator positioned on the outside of tool housing 115. Electrical current is thereby caused to flow entirely on the outside of tool housing 115 in the copper magnet wire of coil 109 for supply to storage capacitor 113 and ultimately for powering LEDs 114 of luminaire 106.

Figure 3:
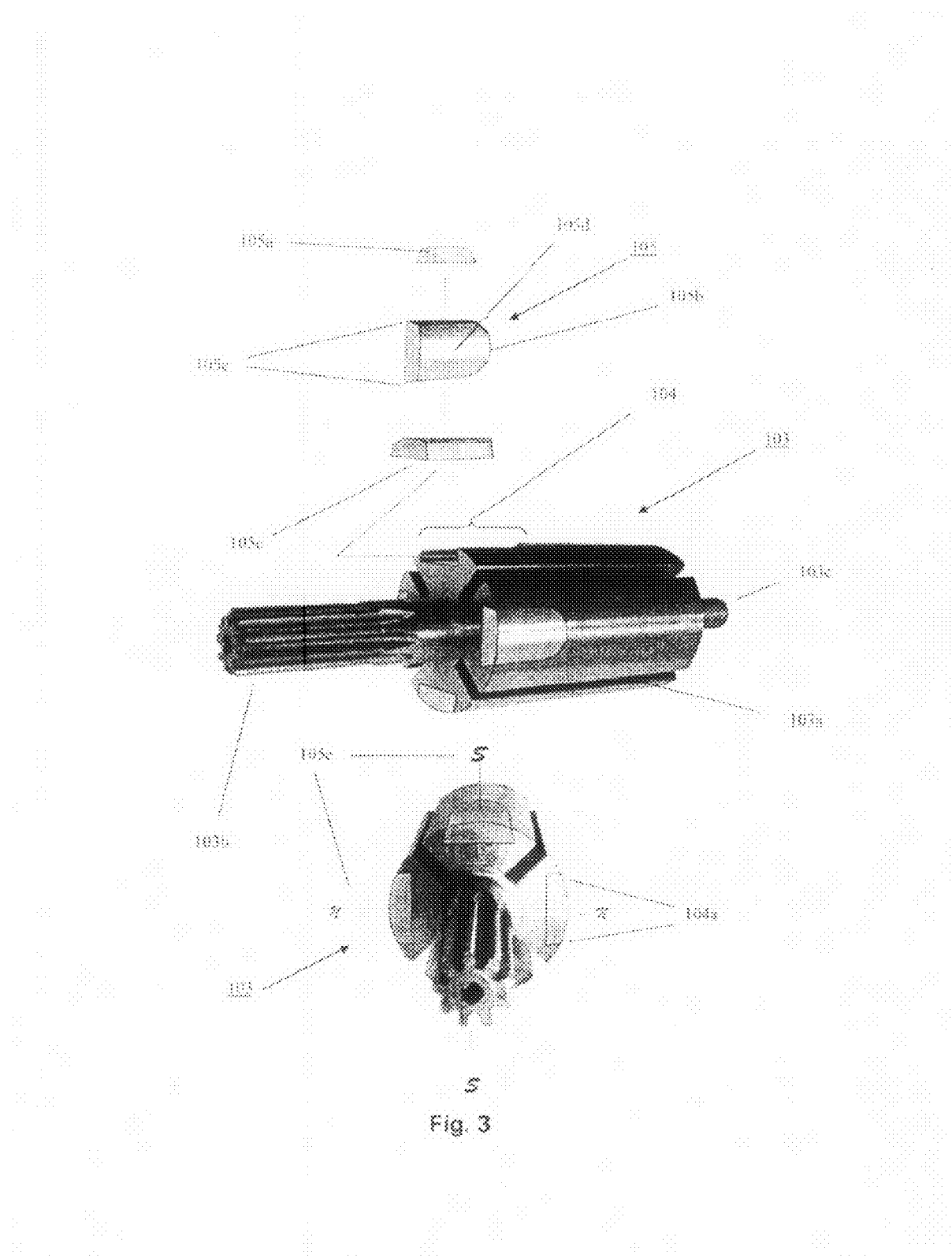
FIG. 3 is a view of a rotor for an integrated electricity generator from front and perspective views, and a magnet for receipt in a groove thereof.
Figure 4:
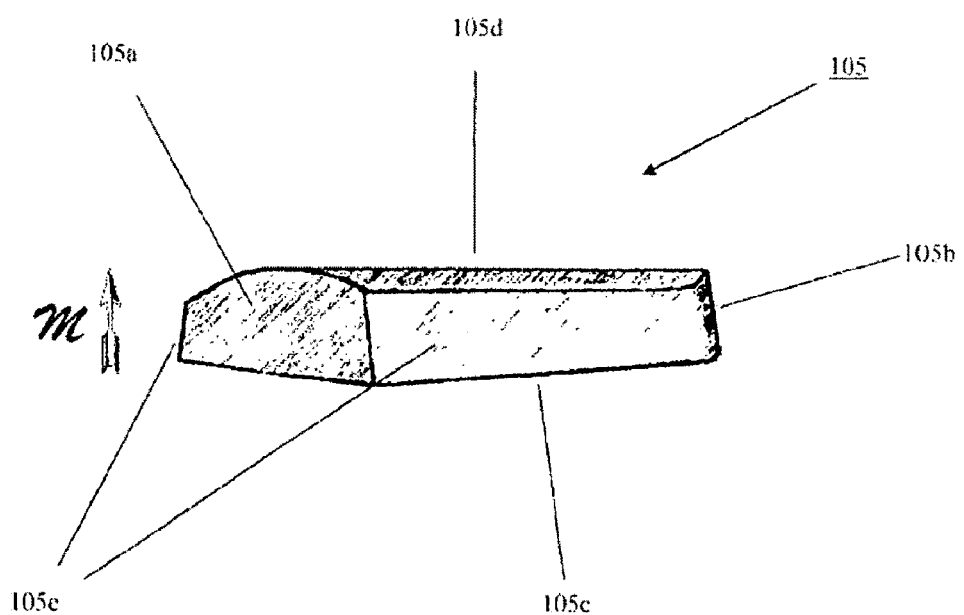
FIG. 4 is a perspective view of a magnet for receipt by a corresponding groove in a rotor body.

FIGS. 3 and 4 illustrate rotor 103 and a magnet 105 for receipt therein. Magnet 105 is a permanent magnet (preferably formed of a high-grade Neodymium-Iron-Boron pressed powdered metal, or "NdFeB"). Alternatively, magnet 105 may be formed of Samarium Cobalt (SmCo). NdFeB and SmCo are known as rare earth magnets, which are presently some of the most powerful permanent magnet materials commercially available. Furthermore, rare earth magnets are advantageously very difficult to demagnetize, making them very suitable for use in the vibration-intensive environment of a pneumatic tool motor. One drawback of the use of rare earth magnets is their potentially lower resistance to corrosion, although with pneumatic tools this detrimental corrosion is attenuated somewhat by the normal use of tool lubricating oil. To further inhibit the amount of contact by water moisture and air typical of, for instance, a compressed air stream, it is beneficial to coat magnet 105 by using a corrosion-resistant material such as an epoxy, catalytic automotive epoxy sealant, zinc chromate or epoxy-chromate. Alternatively, magnet 105 may be plated using nickel electrodeposition.

Magnet 105 has a North-South or South-North field perpendicular to its length and width, and is dimensioned to complement and be securely retained by rotor 103. The physical size of the magnet required to generate electricity depends partly on the Maximum Energy Product (BHmax) of the magnet material measured in megaGauss Oersteds (MGOe), commercially defined by a grade number designation. Generally, the higher the MGOe grade number, the less magnet volume (surface area) will be required for a target application. For a tool embodiment having a housing 115 and rotor body 103 of previously described dimensions, a 42 MGO magnet having rectangular dimensions of about 1.0 inches L×about 0.250 inch W×about 0.125 thick (T) provides a suitable excitation field for general work surface illumination purposes. The "M" arrowed in FIG. 4 shows the polar orientation of magnet 105. A plurality of magnets 105 (four magnets 105 in FIG. 4) with alternating polarities is retained securely within machined, cast or molded grooves 104 of a machined, press-powdered metal (PPM) or injection molded plastic rotor 103. More particularly, the magnets 105 at 0 degrees and 180 degrees have respective North poles facing the outside of rotor 103, whereas the magnets 105 at 90 degrees and 270 degrees have respective South poles facing the outside of rotor 103. Secure retention of the magnet 105 in the rotor body 103 is important due to high-speed acceleration rates and momentums reached during operation of air ratchet wrench 100. It is primarily the shapes of magnet 105 and mating groove 104 that enables magnet 105 to be received by and retained within groove 104 when rotational momentum causes maximum opposing inertial forces to act upon rotor 103 thereby forcing magnets 105 outward from the axis of rotation of rotor 103.

In particular, magnet 105 has a flat face 105a on one side, and a curved (or "rounded") side 105b opposing the flat face side 105a. Magnet 105 also has a flat base side 105c, and a curved (or "rounded") top side 105d opposing flat base side 105c with a curve radius that permits it to be generally continuous with the external surface of rotor 103 when magnet 105 is received by groove 104. Magnet 105 also has oblique sides 105e that are not perpendicular to flat base side 105c and generally mirror oblique sides 104a of groove 104. Magnet 105 and groove 104 thereby mate in a generally dovetail configuration. Magnet bonding adhesive provides additional retention of each magnet 105 within its respective groove 104.

It can be seen that rotor 103 is generally of a conventional pneumatic tool configuration, with the exception that it further includes grooves 104. As will be familiar to the skilled worker, a hobbed pinion 103b on the shaft of rotor 103 is for driving gears at the working end of the air ratchet wrench 100. A rear bearing axial shaft 103c protrudes into the rear end plate (not shown in FIG. 3) supported by a ball bearing (not shown in FIG. 3). It can be seen in the end-view of FIG. 3 that the machined, generally dovetail-shaped groove 104 cooperates with magnet 105 to retain magnet 105. The alternating polarities 105e of magnets 105 are also shown.

Figure 5:
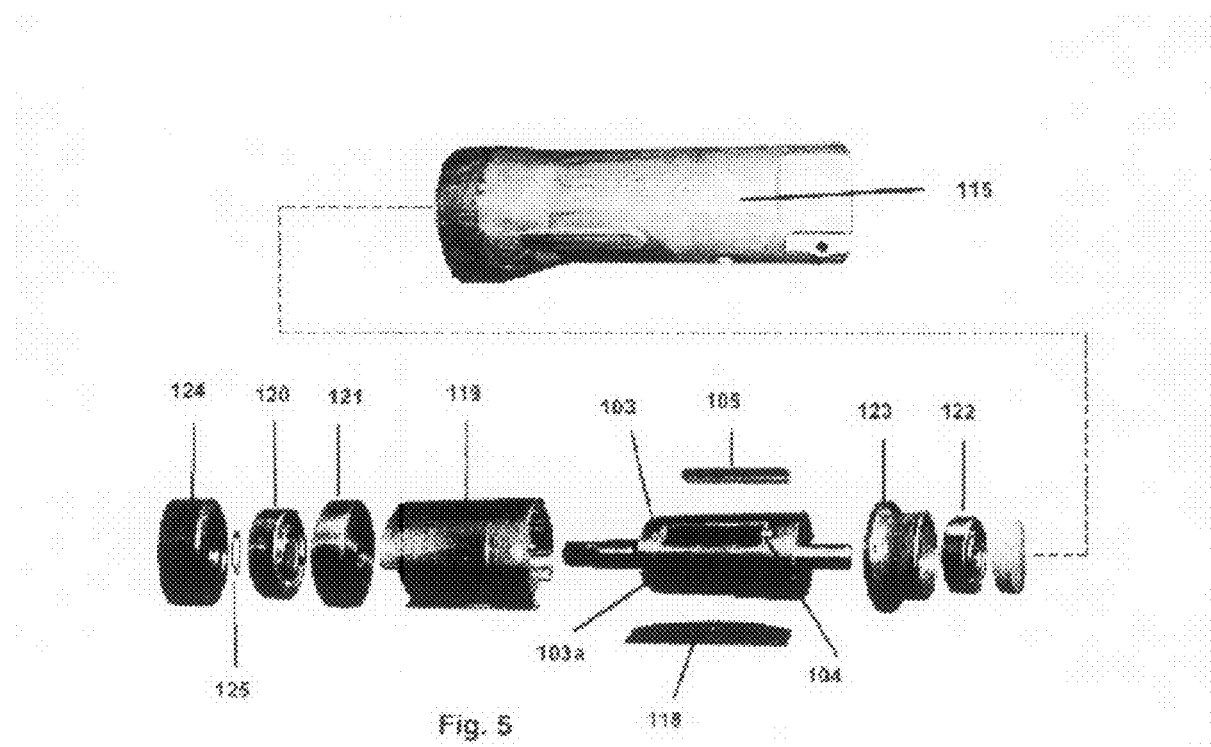
FIG. 5 is an exploded view of an air motor, according to an embodiment.

FIG. 5 is an exploded view of an air motor having conventional components with the exception of rotor 103, which has been modified to receive and retain magnets 105, and a change from conventional ferrous to nonferrous material composition of an air cylinder 119. Air cylinder 119 is nonmagnetic and is formed of Pressed Powdered Metal (PPM) containing sintered 300 series stainless steel. The PPM formulation can optionally contain a lubricant impregnated into the walls of cylinder 119 to attenuate friction between the contact surfaces of sliding vanes 105. Cylinder 119 can be a separate component, as is the case in most conventional air tool constructions, or part of a molded over "inner" tool housing; similarly demonstrated in U.S. Pat. No. 5,017,109 entitled Cylinder And Housing Assembly For Pneumatic Tool to Ingersoll-Rand, the contents of which are incorporated entirely by reference herein. In the '109 patent, a nonconductive plastic composite is molded directly over the external surface of an air motor cylinder (in this case a nonmagnetic cylinder 119) effectively merging it with tool housing 115. Such a construction can be utilized to create an electronics-supporting tool casing. To fully encase and protect electronic arrangements situated on the external surface thereof, a second composite housing, in the form of a sleeve, is formed to slide over the electronics-supporting inner tool housing thereby forming a nonconductive protective shell to shelter stator, circuitry and other onboard electronics.

A high rpm front motor bearing 120 is concentrically retained by a front motor bearing end-plate 121. A second high rpm rear motor bearing 122 is concentrically retained by a rear motor bearing end-plate 123. A flywheel 124 is disposed on the end of the shaft, where a retaining clip 125 maintains a positive stop position of flywheel 124. It will be noted that magnets 105 in FIG. 5 have a different configuration than those shown in FIGS. 3 and 4 and are therefore retained in grooves 104 having a correspondingly different configuration. However, it will be understood that the configurations of magnets 105 and grooves 104 shown in FIGS.

3 to 6, a plastic rotor with magnets molded in or a rotor comprised of PPM magnetic material may be considered alternatives. Therefore, while one may provide certain advantages over the other, the principles of operation of the alternative embodiments of the integrated electricity generator disclosed herein are generally the same.

Figure 6:
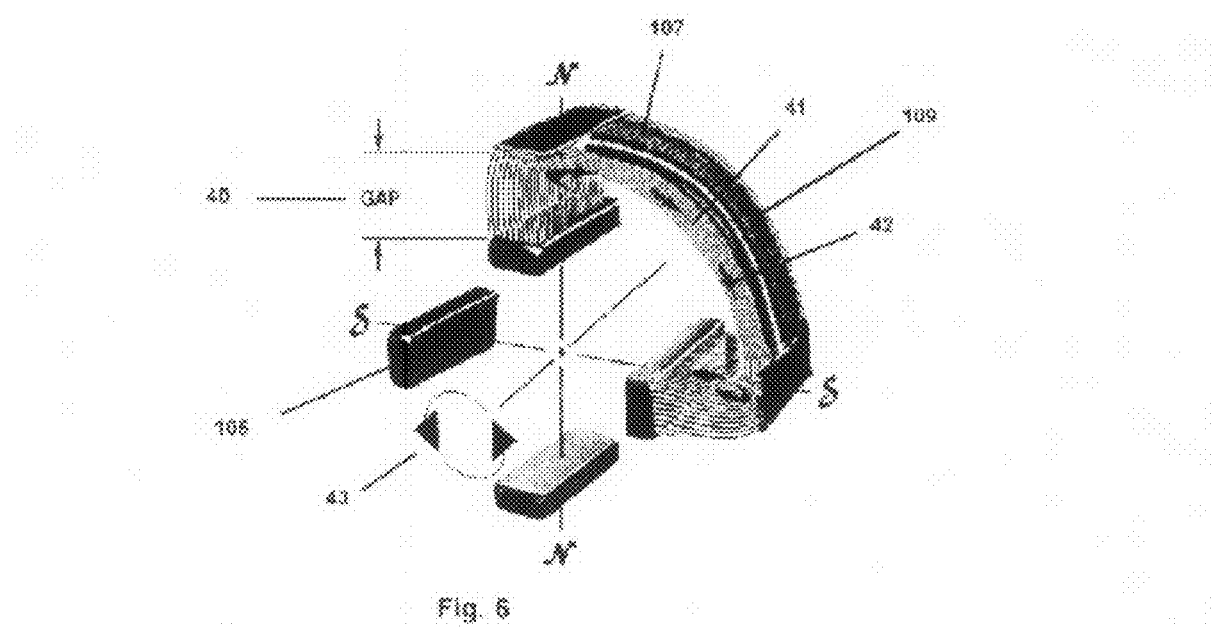
FIG. 6 is a perspective view of the interaction between rotor magnets and a stator adapted for positioning on the outside of the tool housing.

FIG. 6 is a graphic representation of magnetic flux field as inductive coupling occurs between magnets 105 and inductor element 107. A flux transfer path represented by the lines shown in the GAP area may be considered for ease of understanding as a magnetic analog to the electrical transfer of energy through wire at the feed-through conduits of prior art structures referred to herein. The lines 41 drawn alongside inductor element 107 show magnetic permeation of inductor core 110 at peak AC electrical cycle represented by its sinusoidal waveform. It can be seen that magnets 105 are radially aligned with their magnetic orientations, depicted by magnetic N and S, arranged about an axis with respect to a center line corresponding to the axis of rotation of rotor 103. Inductive element 107 is proximal to magnets 105 when stator comprising luminaire 106 and inductive element 107 is aligned and supported in its intended resting position by tool cover 116 on the external surface of air ratchet wrench 100. "GAP", the space between the respective magnetic pole surfaces of magnet 105 and those of flux absorbing ends of inductor core 110, is a magneto mechanical critical dimension, because distance affects strength of a magnetic field measured in gauss, directly affecting induction within inductor core 110. The alternating magnetic field sweeps into the inductor core 110 providing the source for electromotive force (EMF) in the coil wire at the top of each cycle of polarity change. For grade MGO 42 permanent magnets, an efficient generator embodiment works through a GAP of about 0.290 to about 0.330 inches between face of magnet 105 and face of end surfaces of inductor element 107. Variation in these dimensions from this scale can be slightly greater by up to an additional 0.035 inch, however, for efficiency should be kept as minimal as possible because magnetic field strength of a magnet is approximately proportional to the inverse cube of a distance (in this case measured in inches) from the magnet. For example if the distance between the magnet and the end surfaces of inductor core 110 is tripled, the magnetic field strength will be reduced (roughly) by a factor of 27, yielding diminishing EMF by-product in the coil accordingly. "GAP" is depicted mainly to denote a greater variance in this critical dimension that is controlled by increasing the magnet grade or size. Therefore, for an air tool application it can be seen that this method is far more versatile over salient pole designs of prior art; in which GAP is constrained to critical tolerance of between about 0.005 inches to about 0.020 inches overall. The opposing ends of the "I"-shaped inductor core 110 in this case are the "salient" side pole arrangements of prior art. Inductor core 110 is therefore curved, or "arced" as has been described, to achieve a consistent GAP between end surfaces of inductor core 110 and the magnet surface 105 as magnets are rotating about the axis of rotation of rotor 103 along their motion path. The approximate length of an arced I-shaped inductor is calculated from a GAP dimension represented by variable "g", a magnet (or magnetic field) width variable "w" and a rotor radius variable "r" in an expression ½ pi (r+g)+ (w/1.25). The lines 41 show the magnetic flux path density during inductive coupling tending to curve along "arced" inductor 107, and extending from magnet-to-magnet. A magnetic circuit is thereby completed through this inductor "bridge" by the coincidental alignment of the opposing inductor 107 ends with respective magnets. Arrows 42 are shown along a direction of flux flow through the magnetic circuit path, which magnetic flux induces electrical current in the copper magnet wire of perpendicular coil 109. Arrows 43 about the axis of rotation of rotor 103 show the physical direction of rotation of magnets 105 through space during operation along their motion path.

For a pneumatic tool, stator and rotor magnets comprised of a rotor, cylinder, tool housing, magnetic components and inductor of hereinabove described materials and related dimensions; the expected current generated by a single stator element will be about 250 to about 275 mA (milliAmperes) at a nominal 16,600 revolutions per minute (RPM) rotational speed. The current will be delivered at a nominal 5.23 to about 5.65 VAC (Volts, AC) at a frequency of about 0.553 KHz. Preferably, the rotor speed for quick charging of the described capacitor types or thin cell LiPo battery should be a conventional about 19,000 to about 21,000 RPM through an initial approximately 10-15 seconds. After that, when performing work the tool motor RPM level typically drops to about 10,000 to about 12,000 RPM for varying periods and may even stall, such as when a ratchet wrench is performing a fastening operation. However, after the initial charge and through the varying time constants of slower RPM, the charged capacitor or cell will continue to deliver relatively uniform DC power to LEDs. At zero RPM, LEDs will remain on brightly for up to about 120 seconds for 2 F (Farad) capacitor. Discharge times are longer for higher energy density storage devices i.e. lithium ion cells.

Figure 7:
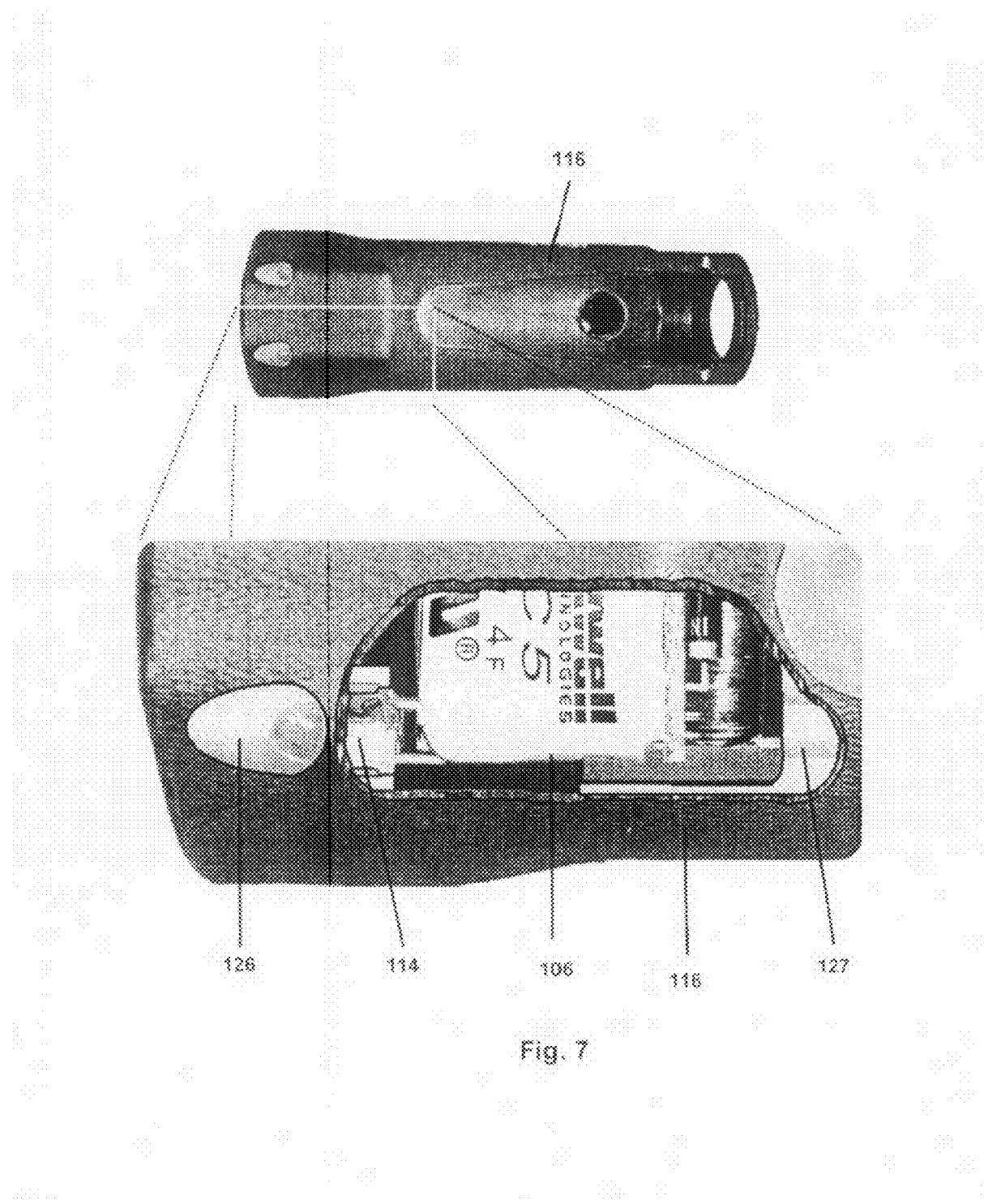
FIG. 7 is a top view of an elongated working-side view of a pneumatic ratchet tool cover and a close up cutaway view of the tool cover with an embedded inductive luminaire.

FIG. 7 shows both an elongated working-side view of a pneumatic ratchet tool cover 116 and a close up cutaway view of tool cover 116 with embedded inductive luminaire 106. Tool cover 116 may be flexible, comprised of Polyurethane or EPDM (ethylene propylene diene monomer) or some other durable nonconductive, nonabrasive, shock, chemical, heat resistant and vibration insulating material, such as modified vinyl, rubber, silicon or closed cell foam rubber that is easily gripped and can slide over the surface of an air tool motor-housing. Tool cover 116 mates with tool housing 115 so as to position the inductor element 107 on the outside of tool housing 115 such that it is properly aligned or magnetically "registered" with magnets 105 retained by rotor 103 disposed within motor cylinder 119 and tool housing 115. Tool cover 116 also acts to provide a protective nonconductive barrier to electronic components from detrimental effects in the work environment and to position luminaire 106 such that the angle of emissivity of light from the luminaire can be properly directed towards a workpiece. Tool cover 116 may be molded around one or both of luminaire 106 and inductor element 107 thereby to support and position these components properly with respect to the magnets 105 and a workpiece. Tool cover 116 therefore includes all of the normal and usual recesses and openings to enable a sliding fit over a typical tool housing with its conventional mechanical features. The tool cover 116 includes special grooves on its internal surface wall that matingly slide over raised lands on the motor housing, thereby providing means for anti twisting alignment of cover with the motor housing and can accommodate protruding air valve stem, lever roll pin and air inlet, etc. Tool cover 116 shown in FIG. 7 also includes a recessed reflector 126 or LED light concentrating lens embedded within a high-density buildup of surrounding protective material to prevent damage to LED (s) 114 and reflector 126 or LED light concentrating lens embedded therein. A magnetic shield 127 of high magnetic permeability, such as Siemens VacuPerm 70 hi-permeability Mumetal foil, absorbs stray magnetic field to thereby inhibit interference of magnetically sensitive electronic components in the work environment.

Figure 8:
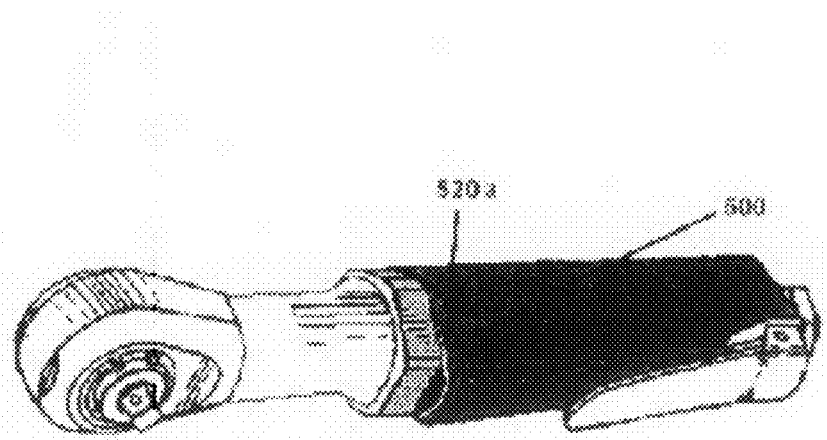
FIG. 8 is a perspective view of a pneumatic ratchet wrench that may be enclosed in a two-part plastic protective tool cover, shown disassembled.

FIG. 8 shows a pneumatic ratchet wrench having a typical nonferrous cast metallic handle enclosed in a plastic protective tool cover 500. According to an embodiment the bulk of the unique tool cover 500 is nonconductive material and further incorporates discrete copper (conductive) strips, or a dielectric substrate with etched copper traces, printed nanometal silver or copper deposits to form a voltage plane that is embedded in an insulator. The dielectric cover with embedded circuits is thereby an electrically conductive distributor referred to as a conductive tool cover. A smaller removeably detachable illuminator 510 of likewise construction incorporates LEDs 114 and interfaces with the conductive tool cover 500 via contact terminals 520.

The embodiment in FIG. 8 enables efficient access to a threaded ring nut joining the tool handle to the ratchet assembly, particularly during routine service and repair of unitized tool constructions. The electronic square area, however, advantageously spans the end-to-end surface of the cylindrical tool housing 500. Unitized construction is typical of powered ratchet wrenches and one of the main benefits of a conductive tool cover 500 detachable from illuminator 510 is to electrically bridge the junction of tools having joined unit construction, which enables the luminare closer proximity to the working end of the tool.

Embedded within the tool handle cover is a stator with at least one inductor element 107 and electrically conductive circuit as has been described. Current generated in the embedded inductor of conductive tool cover is fed directly through its external conductive circuit to LEDs 114 via contact terminals 520 of the circuit. Advantageously, no other discrete circuit connectors, contact points or other means of hardwiring breaching the motor housing of the tool are required for illumination applications. Hermetically sealed I/O hardwiring passing through the motor housing may be utilized if an application requires external stator power to be supplied to sensors or special circuits internal to the tool: i.e. torque load-cells embedded around motor mounts, magnetostrictive sensors around rotating shafts, event monitors such as non-contact vane-wear or lubrication sensors. Optionally, forms of "data" regarding tool-operating parameters may be gathered through demodulation of magnetic field variations through the tool housing, similar to the reactive coupling used to transmit and receive data through well casings in hybrid down-hole well drilling communication systems. A second embodiment of unique conductive tool cover 500 facilitates use with prior art air motor generators, such as that described in U.S. Pat. No. 7,095,142. To transfer electricity to the cover circuit from a prior art "internal generator" (where hermetic hardwire is formerly required), embedded conductors on the tool cover 500 simply have open contact pads exposed on its internal surface (not shown), which are positioned to align and connect the circuit via insulated compression terminals affixed to an insulator base pressed into the cast metallic tool housing. Circuit connection is made during assembly, by action of sliding the tool cover over the motor housing, thereby compressing terminals to contact pads. Spring-biased compression terminals commonly used in cell phones to make battery terminal connection are one means to accomplish a sliding connection. This arrangement enables connection of circuits during typically normal phases of tool assembly. The embedded circuit of a luminaire portion of the tool cover also has plug like contact terminals 520b within its structure. The contacts mate with receptacles on the handle cover when the luminaire is clamped and matingly locked into aligning position on the ratchet housing via its semi-rigid and grip-like structure 510.

To provide sufficient clamping pressure to the tool body semi-rigid materials are preferred for the tool cover and snap-lock features (not shown) at the joint of the two tool cover components will further ensure reliable unity between the conductive tool cover segments. In addition to conductors, the tool cover may also contain cavities for retaining thinly structured moderately fast charging Nickel-Metal Hydride battery cells or fast charging thin-cell Lithium Ion (LI) polymer cells, Aerogel ultra-capacitor as previously described, or even fuel cells. A preferred conductive tool cover may embody a credit card sized area in the form of a recessed cavity wrapped around a segment of the cover at an approximate depth of about 0.090 inch, for housing a flexible battery, such as previously described extremely fast charge, high power density Organic Radical Battery (ORB). The organic radical battery (ORB) is a new class of rechargeable battery being uniquely developed by NEC, which is based on cathode and anode structures and chemistry similar to the commercialized Lithium ion battery except for the use of earth friendly organic radical compounds PTMA, or "2,2,6,6-tetramethylpiperidinoxy-4-yl methacrylate," with excellent durability. The ORB demonstrates extremely high power density and good cycle ability making it suitable for a range of next generation power tool applications. A significant difference attributed to the ORB from conventional rechargeable batteries commonly found in devices such as notebook computers and cell phones, is that instead of using poisonous ingredients like lithium and cobalt, PTMA is a nonpoisonous or earth friendly material.

Figure 9:
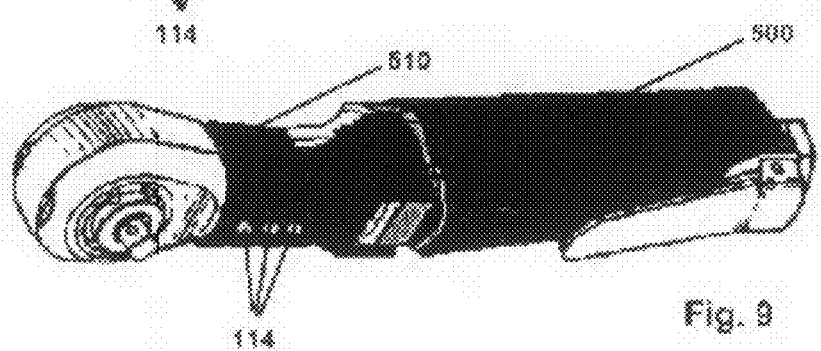
FIG. 9 is perspective view of the pneumatic ratchet wrench of FIG. 8 with the two-part protective tool cover just prior to assembly.
Figure 10:
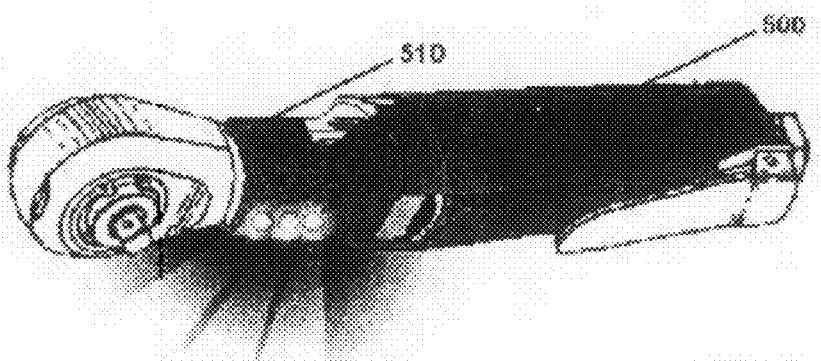
FIG. 10 is a perspective view of the pneumatic ratchet wrench of FIG. 8 with the two-part protective tool cover having been assembled.

FIG. 9 shows how the separate segments of a two-part conductive tool cover of FIG. 8 align on a segmented tool body of unitized construction during assembly. FIG. 10 shows the two-part conductive tool cover incorporating embedded electronics for illumination, as it would appear during operation.

Figure 11:
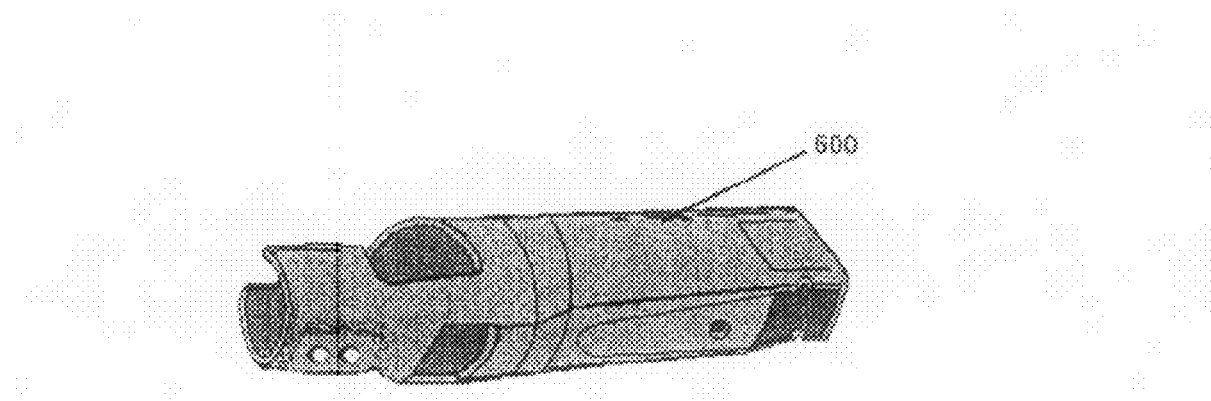
FIG. 11 is a perspective view of a conductive tool cover of single-piece construction for a pneumatic ratchet wrench, according to an alternative embodiment.
Figure 12:
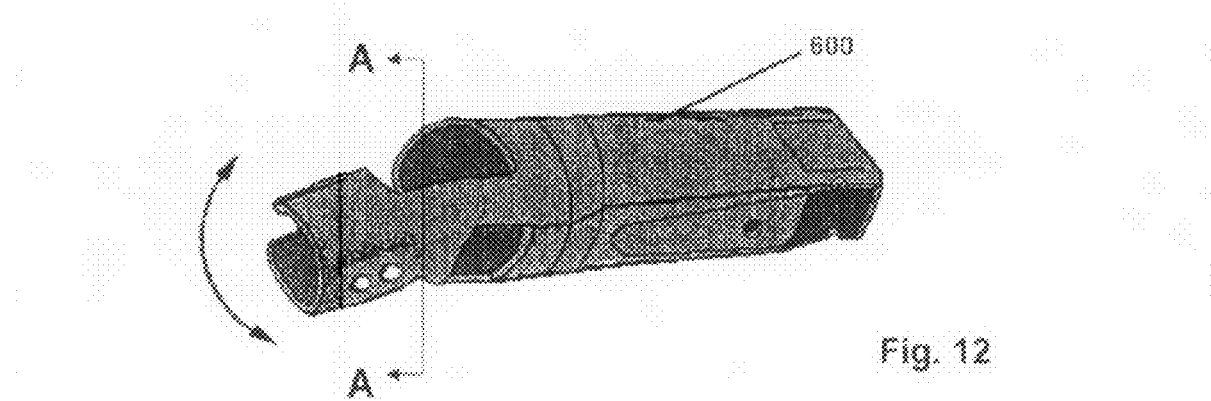
FIG. 12 is a perspective view of the conductive tool cover of FIG. 11, one segment of which is shown pivotable with respect to another.
Figure 13:
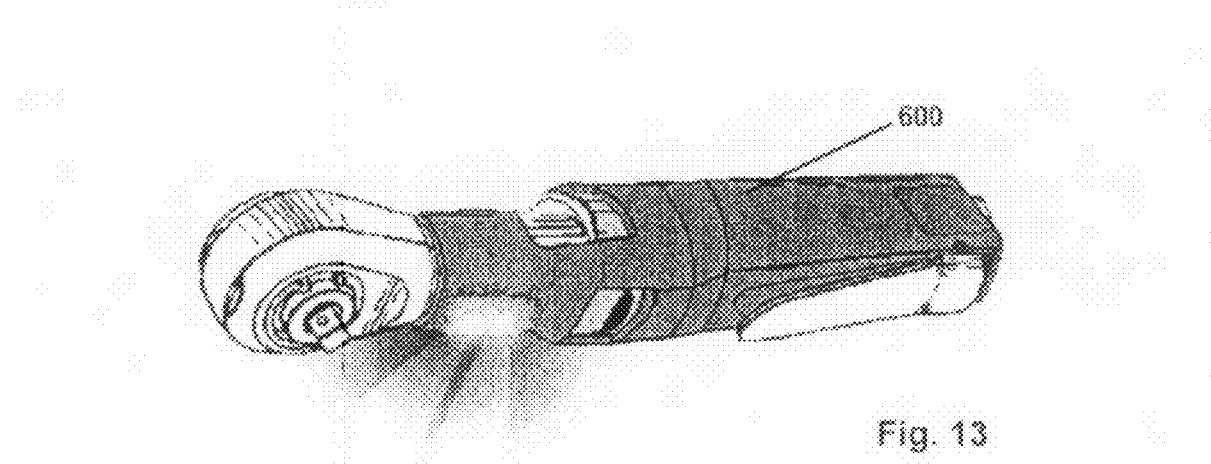
FIG. 13 is a perspective view of the conductive tool cover of FIG. 12 having received the pneumatic ratchet wrench and with lights in the pivotable segment having been illuminated.

FIG. 11 shows an embodiment of a conductive tool cover 600 of single-piece construction, that is adaptable to a tool of joined unit construction as described earlier, further comprising both resilient flexible conducting and insulating materials in alternate layers. The layers are arranged in three basic groups: group (1) is formed of single or plural conductive layers insulated from each other from which electronic circuit traces are formed and components connected. The group (1) layer is interposed as required in an insulating layer group (2), together that are further interposed between a group (3) of bulk insulators that form a final exterior boundary, protecting the former layers from the environment. FIG. 12 shows segment A-A of a flexible conductive tool cover, the structure of which entails the use of highly flexible metalized elastomeric conducting material. Material can be a copper (Cu) or silver (Ag) coated polymer disposed between insulators to form a conductive bridge between illuminator and main circuit of cover 600. Advantageously, this construction enables deployment of a single-piece conductive tool cover in combination with two-part unitized air tools, thereby eliminating the need for any terminals, connectors and additional parts. FIG. 13 shows a single-piece conductive tool cover 600 incorporating electronics for illumination, as it would appear during operation.

Because the luminaire portion is inseparable from the main tool body cover as opposed to the structure of FIG. 8, the embodiment of FIGS. 11 to 13 requires a higher degree of flexibility in its embedded conductors and material medium, especially in the region of section A-A shown in FIG. 12 spanning the tool's adjoined sections. One combination that can be used to accomplish conductivity with flexible structural integrity is laminated conductive traces etched into metallized polyimidi (Kapton by Dupont) to form flexible circuits that can be molded into a urethane matrix to form the cover.

Figure 14:
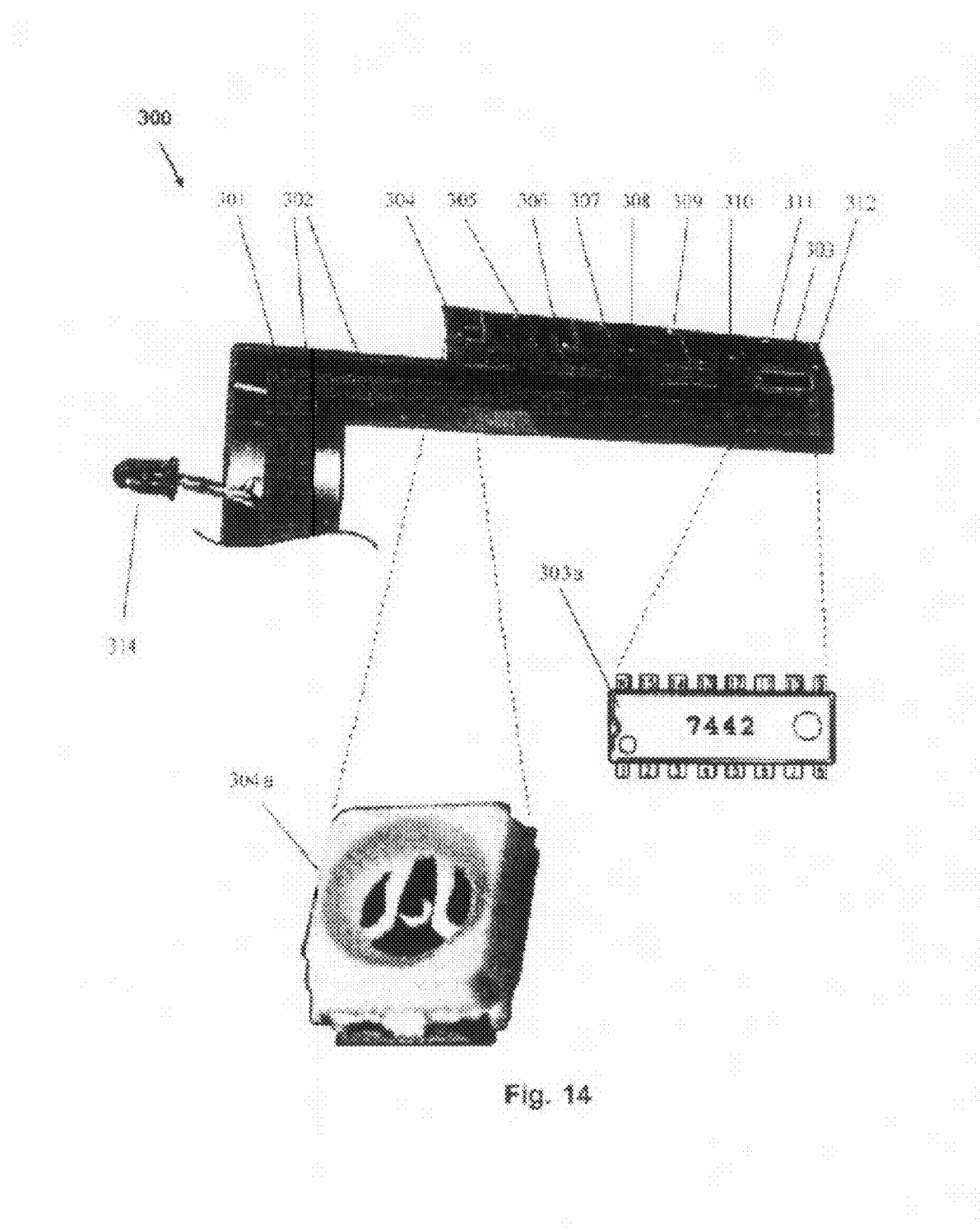
FIG. 14 is a flat, flexible printed circuit (FFC) connecting LEDs and integrated circuit (IC) chip for incorporation into a protective flexible tool cover.

FIG. 14 shows a flat, flexible printed circuit (FFC) 300 having white LEDs 314 for incorporation into a protective flexible tool cover, otherwise known as a tool boot, to provide illumination. The FFC 300 further incorporates a plurality of surface mount device (SMD) LEDs 304-312 and display driver comprising a transistor-transistor-logic (TTL) chip 303 or smaller chip-on-board (COB) (not shown) and operates as an electronic nameplate "insert" for a conductive tool cover. The term "insert" as used herein may be understood to mean the component is placed on a framework to be positioned within a mold prior to an injection of plastic or, the component is placed into premolded encasements, sandwiching electronic package between encasements to be ultrasonically welded together, or adhesively joined. Additionally, inserts can be designed to be interchangeable and to facilitate robotic pick-and-place injection molding and assembly solutions in mass production environments.

The circuit, complete with attached components, can be inserted into retaining means provided as recessed cavities on the external surface of a generally cylindrical pre molded sleeve adhesively applied to an air tool motor housing and together with the tool motor housing inserted into a protective cover during final tool assembly.

The FFC printed circuit of FIG. 14 is comprised of non-conductive laminates 301 of polyimidi film enveloping planar conductive traces generally at 302 having an extremely low profile. Rectified AC current, from, for example, external stator inductor element 107, connected through conductive traces 302, is provided to a micro display driver integrated circuit (IC). The display driver IC is comprised of a control chip, such as a transistor-transistor-logic (TTL), or smaller ultrafast complementary metal oxide semiconductor large-scale integration (CMOS LSI) structure in a chip-on-board (COB) package, such as a GF-2391 (not shown) or a BCD-to-Decimal Decoder IC, 7442 shown at 303. A larger image of FIG. 14 shows a typical pin-out on a driver such as the 7442 IC at 303a Driver IC 303a in circuit with a single 1 KHz 555 timer IC and one 4-bit asynchronous decade counter IC, 7490 is capable of sequentially pulse firing up to ten (10) surface-mount high brightness LED emitters 304A of different colors. Smaller scale equivalent ICs that use less power are available.

The LEDs 304-312 are caused to light whenever the tool is in operation, and can be embedded in the tool cover in such a manner to brighten the area of the characters of the indicia. Further shown are high brightness white light LED(s) 314, such as two (2) of Nichia's NSPW300CS. A preferred embodiment deploys a single extreme intensity CREE X Lamp XREWHT 7090 (not shown) capable of emitting 100 lumens. LED(s) 314 are energized by the integrated air motor generator through a switch (not shown) in the path of conductors of FFC 300, causing operation of LED(s) 314 independent of LEDs 304-312 and the indicia driver chip 303. A low profile switch (not shown) in the circuit provides conservation of electrical power, means to accomplish faster initial charging of a capacitor or battery cell and faster initial powering up of other electronic features or systems on board the tool prior to switching on lighting of the work surface during an operation. The LED(s) 314 provide illumination at a work surface ahead of the tool. Illumination is desirable to achieve enhanced visibility in dimly lit environments and may optionally be switched on automatically by addition of dark-detection circuitry.

The objectives of having electronically enhanced high visibility markings or micro displays, that radiate from a locus on the side surfaces of a power tool can be both apparent, to draw attention and real, to impart useful information. Electronically enhanced power tool indicia can be accomplished through various means. One method is to have distinctively visible patterns of sequentially fired LEDs of alternating colors embedded in the tool cover. Another method highlights tool bodylines, lettering or company logo with neon-like effects utilizing phosphor coated side-emitting fiber optic filaments known as electroluminescent (EL) wire. Yet another method that is more advanced utilizes recently developed EL technology, such as Dupont Luxprint, comprised of systems of insulating, conducting and EL ink to create printed lamps in the form of letters or art disposed between transparent capacitive substrates embodied with the tool. In this disclosure, an electronic "nameplate" is specified and as such, the lighted label obviously has the capability of raising the tool users consciousness of the name brand or owner of the tool to a higher level. The effect is similar in fashion to that achieved by neon colored tool housings introduced into the power tool market in the 1990s. Power tool body accent lighting effects can be a useful novelty to attain commercial interest such as demonstration of private labels at trade show displays or celebrated product anniversary releases or can be used for more apparent display of private tool users ownership.

It is conceivable that an electronic micro display can be implemented as an electronic "warning" label or as a "reminder" to a tool user, to wear eye protection. Such an arrangement would rely on an infrared (IR) transmitter/receiver break-beam-detection-system coupled to high visibility warning label conspicuously embodied With the tool housing or embedded in a conductive cover that slides over the tool.

The electronic "warning" label power circuit is configured to flash the illuminating label at a high pulse rate during a "warning" mode, whenever the air tool is running. This highly visible, if not visually irritating state of affairs to the tool operator persists until the user adorns eyewear safety shielding equipment of which is optoelectronically "linked" to the tool warning label circuit. The link is accomplished by incorporating into the eyewear shield frame, an associated low power consumption (1.5-6V) infrared (IR) forward emitter that flashes at a predetermined pulse frequency (or multiple frequencies). The shield emitter is triggered into an "on" state by means of a surface-to-surface contact sensor formed as parallel conductive strips embedded in an insulating lamination adhesively bonded along the shield mounting head band, or part that physically contacts with the operators forehead or skin, such as the bridge of the nose whenever protective glasses incorporating the same are worn. Various types of conductive sensor materials that can change a circuit resistance when contacting skin can be used such as plastics containing high carbon content. The shield based contact sensor-switched IR pulsed emitter is optically coupled to an IR receiver on the tool body that is configured to respond at a predetermined matching pulse frequency. A receiver is conspicuously and unobstructively embodied with the tool or tool cover and electrically connected to the warning label. The matched frequency IR receiver controls the tool's display driver. Forward IR emission from the eyewear can be from any point on the outward facing frontal framework of conventional safety goggles, glasses or face shield as long as its IR light pulses can interact through a fairly clear line of sight with the IR receiver on board the tool and in front of the operator. Detection of the IR pulses emitted from the eye shield by a normally "on" receiver optically triggers a TTL driver in circuit with the warning label, into an "off" state for a time constant, similar to a TV remote control operation.

Thereby, while the eye shield's emitter is switched on through the normal wearing by a tool user and facing in the direction of the tool, the warning mode of the tool label ceases operation (safe mode) for a time constant. It can be easily seen that in order to be effective an operator must be facing the tool (receiver) while performing an operation and wearing the electronically enhanced safety shield, which is generally a normal state of affairs when operating power tools. This safety feature is not intended to be limited only to the specified interaction with a lighted warning label indicator, but to the operation of the tool itself by controlling a solenoid valve. Disclosure of this safety feature is not intended to be limited to deployment only on a pneumatic tool. By disclosure, the author intends that the novel safety feature be adapted to control the state of operation of motorized electrical power tools as well, such as with heavy electrical powered industrial grinders, in order to attain a highly enhanced level of safety and safety awareness with use thereof. Thereby, a "smart tool" can in fact assist its operator in the protection of a human eye from the potential hazards that exist in the work environment.

The safety enhancement objective here can also be attained with short proximity radio frequencies, having an arrangement similar to a PC wireless features, having the RF transmitter transceiver, microcontroller and antenna chip, such as an 868 MHz addLINK115 and contact switch located on the safety shield and RFID receiver chip and warning label on the tool. The operation is in similar arrangement to the above described optical break-beam-detection system, however a radio version shuts down the micro display-warning label (or opens a solenoid valve) while the equipment is worn, irrespective of where the user was looking, because it does not depend on line-of-sight interaction. It will be understood of course, that any other known method of data transmission may be employed.

Figure 15:
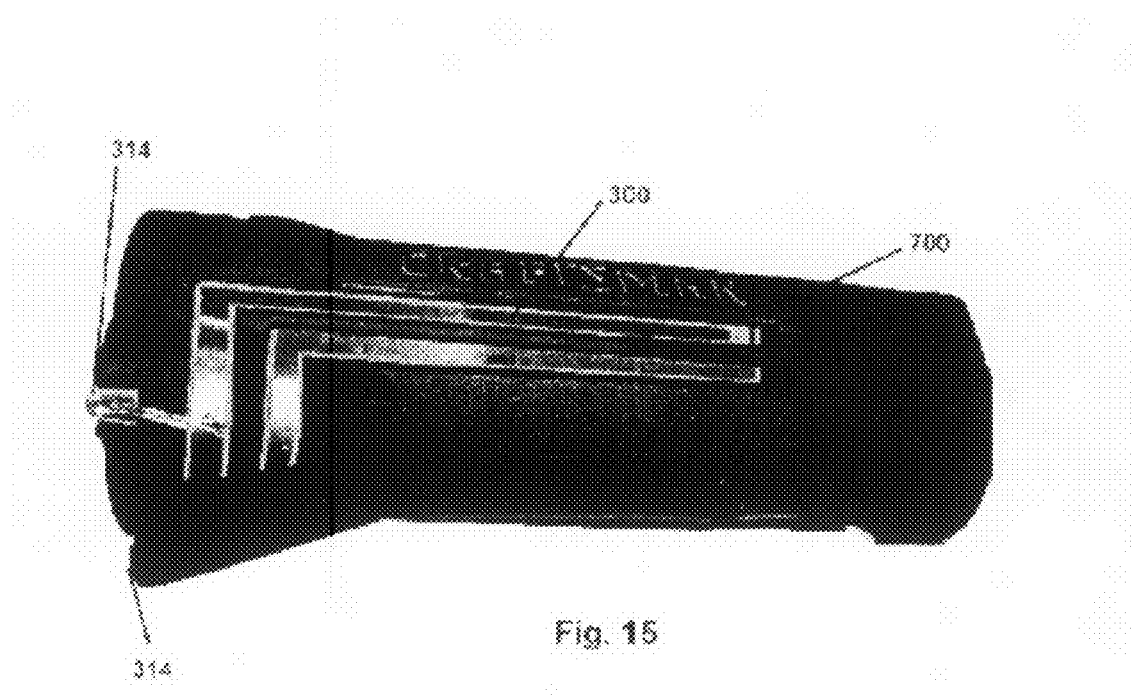
FIGS. 15 and 16 are elevation views showing a conductive tool cover and positioning of the FFC of FIG. 14 for use with an LED enhanced micro display.
Figure 16:
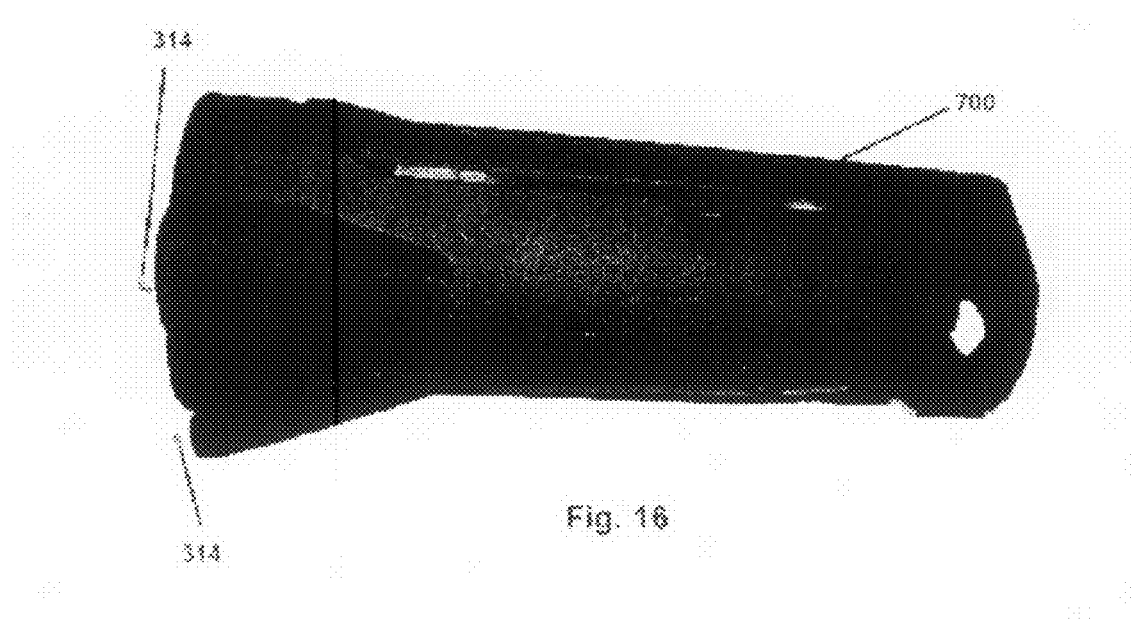

FIGS. 15 and 16 show a conductive tool cover 700 and positioning of the FFM 300 of FIG. 14 with LED enhanced micro display, in cutaway and complete views.

Figure 17:
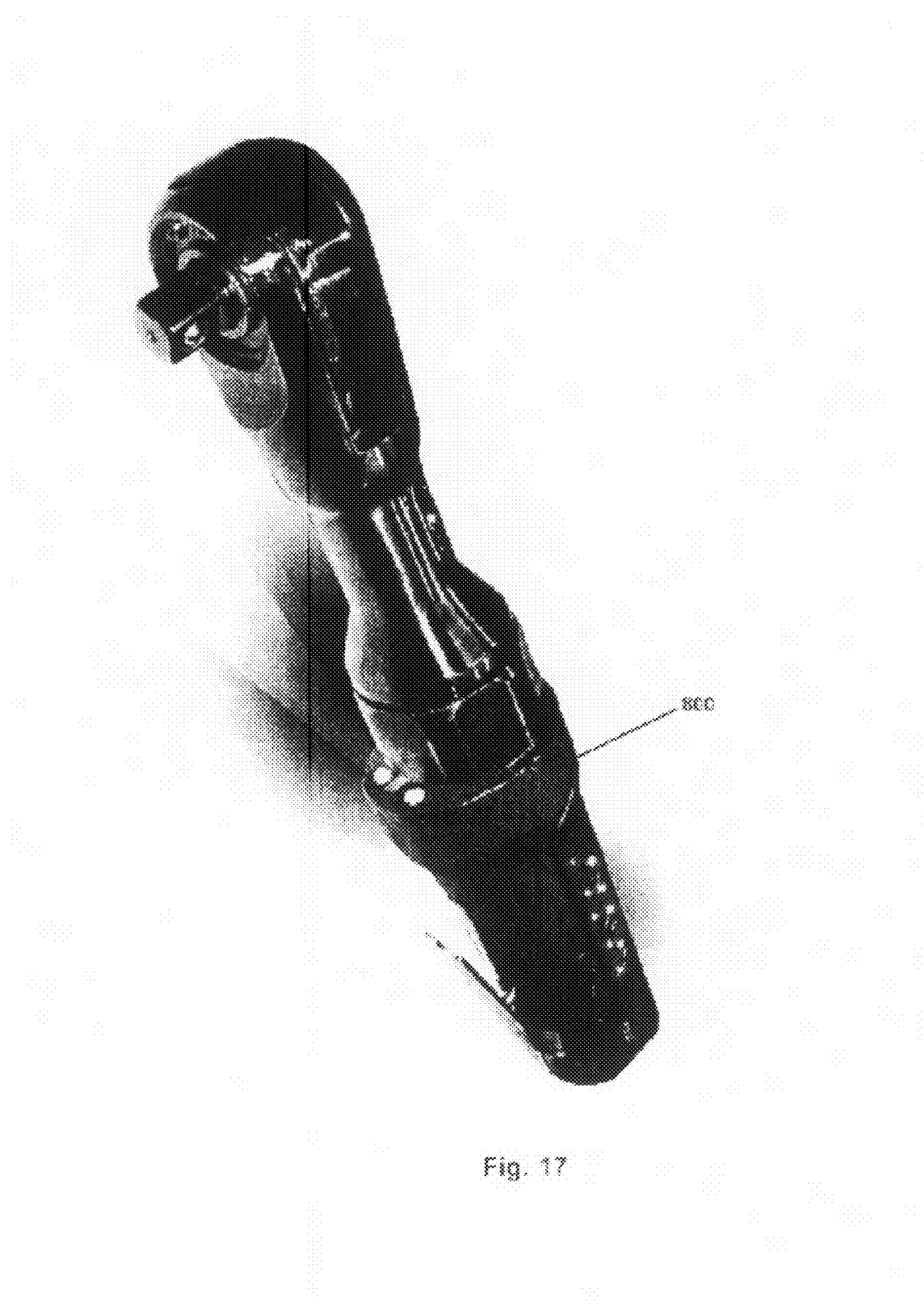
FIG. 17 is a perspective view of a pneumatic tool with a conductive tool cover having embedded electronics for flashing micro display and work surface illumination.

FIG. 17 shows a pneumatic tool with a conductive tool cover 800 having embedded electronics for flashing micro display and illumination applied to a popular commercial brand of air powered ratchet wrench as it may appear during operation.

Figure 18:
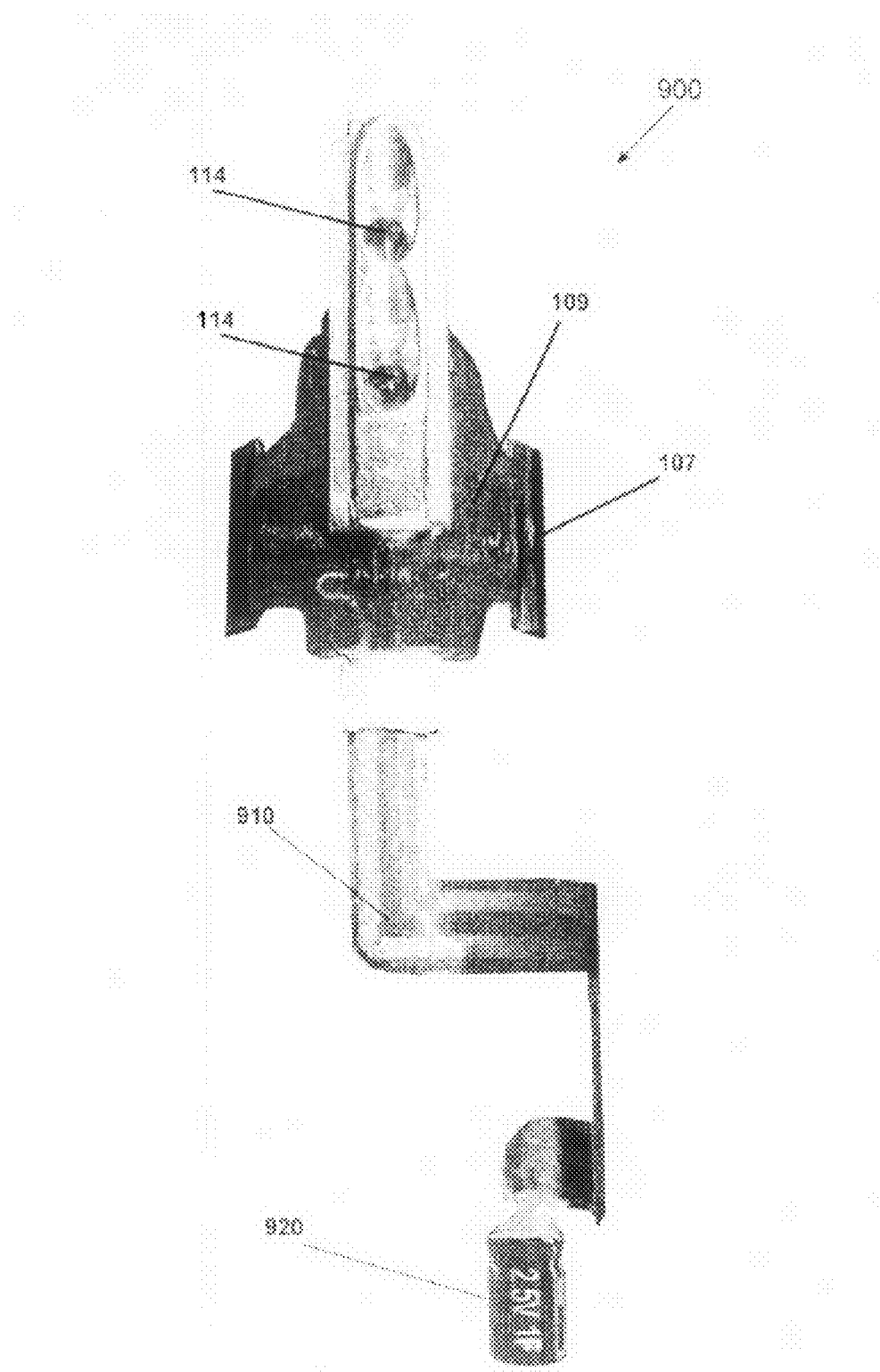
FIG. 18 shows an inductive luminaire connected to remote storage by FFC, according to an alternative embodiment.

FIG. 18 shows another embodiment of a luminaire 900. In this embodiment, a Flat Flexible Circuit (FFC) 910 enables the capacitor 920 placement in a cavity at the back of the tool housing. This embodiment is suitable for a "cover-over-housing" approach in which the addition of too many electronic components in one area on the external surface of a tool housing creates unacceptable tool aesthetics. In this case, FFC 910 enables discrete distribution of components over the housing of the tool.

Figure 19:
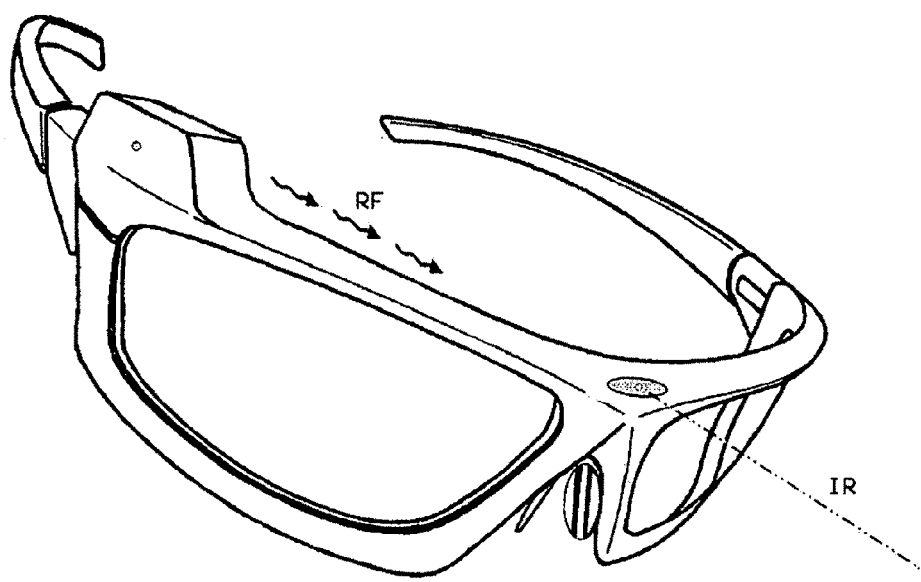
FIG. 19 is a perspective view of safety glasses incorporating radio frequency (RF) and infrared (IR) transmitters for wireless control of safety awareness features embodied with or the operation of a power tool.

FIG. 19 shows safety glasses having embedded electronic radio frequency (RF) or infrared (IR) transmitter (transceiver) for communicating with a remote circuit on a tool. The remote circuit controls a flashing micro display, configured as a hazard warning at a locus on a pneumatic tool conductive cover 800, or controls a solenoid valve that can shut down the operation of a pneumatic tool, or switch an electric tool off whenever the safety glasses are not worn by the operator.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact operation illustrated and described, and accordingly all suitable modifications and equivalents may be resorted to, falling within the purpose and scope of the invention.

For example, while aluminum has been described as the tool housing material, it will be understood that other nonmagnetic materials, such as alloys of 300 series stainless steel, magnesium, brass, glass or carbon reinforced plastic composites or a combination of composites molded over cast aluminum, magnesium or other nonmagnetic housing may be employed also.

While it is advantageous to make use of some of the strongest, most demagnetizing-resistant magnets commercially available such as NdFeB or SmCo for the rotor, it will be understood that the embodiments described herein would work using magnets of any magnetic material, albeit at the cost of reduced induced EMF in stator coil 109.

While the above has been described with reference to a pneumatic tool having a primary function such as a wrench, sander or grinder, it is to be understood that the integrated electricity generator disclosed herein may be employed in tools having other primary functions. One might also conceive of applications wherein the primary function of the tool is to generate electricity for various applications.

While a press powdered metal rotor body has been described, alternatives such as a combination of machined PPM rotor body, molded carbon fiber and plastic composite or molded plastic rotor body may be considered for certain applications.

The above-described contributions enable users of pneumatic tools to benefit from advancements in precision and accuracy in power tool related functions, limited only by high accuracies attainable through the electronic arts and more specifically to functions employing: micro controller chips and displays, memory, computers and digital readouts for fastener torque calculation and monitoring, impact force measurement, automatic lubricators and lubrication reminders, vibration monitoring to alleviate conditions leading to tendonitis, operation cycle counting, location announcing, IR and RF input-output communication devices, visual imaging, theft deterrent, drop monitoring, identification, safety awareness, warranty metering, Internet Wi-Fi operations, light show displays and/or work surface illumination etc.

Although embodiments of the invention have been described, those of skill in the art will appreciate that variations and modifications may be made without departing from the spirit and scope thereof as defined by the appended claims.

What is claimed is:

1. A tool comprising:
   a nonmagnetic tool housing;
   a cylindrical rotor inside the tool housing and rotatable in response to a flow of pressurized fluid through the tool housing;
   magnets mounted in the rotor;
   a stator on the exterior of the tool housing, the stator dimensioned to cooperate with the magnets to, upon rotation of the rotor, generate electrical current for supply to a load, wherein the stator comprises:
   an inductor core having opposing ends connected by a middle portion;
   a coil wound around the middle portion,
   where both the inductor core and coil are configured to be arced between the opposing ends about the axis of rotation of the rotor, and the inductor core is configured to provide a consistent gap between the face of the inductor core and the face of each magnet while each magnet is being rotated between positions proximal the opposing ends, the inductor core having a length to enable its opposing ends to each be simultaneously radially aligned with a respective magnet in the rotor to complete a magnetic circuit through the inductor core.

2. The tool of claim 1, wherein the magnets are spaced generally uniformly about the circumference of the rotor.

3. The tool of claim 2, wherein there are four magnets.

4. The tool of claim 2, wherein each of the magnets is dimensioned to complement and be securely retained within grooves in the circumference of the rotor.

5. The tool of claim 4, wherein each of the magnets has a generally dovetail shape and is received within a respective dovetail groove in the rotor.

6. The tool of claim 5, wherein each of the magnets is adhered in its respective dovetail groove with bonding adhesive.

7. The tool of claim 1, wherein the magnets are rare earth magnets.

8. The tool of claim 7, wherein the magnets are formed of one of Neodymium-Iron-Boron and Samarium-Cobalt.

9. The tool of claim 1, wherein the magnets are coated with a corrosion-resistant material.

10. The tool of claim 9, wherein the corrosion-resistant material is one of an epoxy, a catalytic automotive epoxy sealant, zinc chromate and epoxy-chromate.

11. The tool of claim 1, wherein the inductor core is comprised of magnetically saturable electrical steel.

12. The tool of claim 1, wherein leads from the coil are connected to a power conditioning and storage circuit for supplying current to the load.

13. The tool of claim 12, wherein the power conditioning and storage circuit comprises a rectifier diode and a capacitor.

14. The tool of claim 12, wherein the power conditioning and storage circuit comprises a flat flexible circuit.

15. The tool of claim 1, wherein the load is a light source.

16. The electricity generator of claim 1, wherein the inductor core is I-shaped.

17. The tool of claim 1, wherein the inductor core arc spans 90 degrees.

18. The tool of claim 17, wherein the inductor core arc has a radius of about 0.77 inches.

19. The tool of claim 1, wherein the tool is a pneumatic tool.

20. A stator for cooperating with a rotor having magnets mounted therein and disposed within a tool housing of an integrated electricity generator of a tool, the stator configured to be disposed on the exterior of the tool housing and comprising:

an inductor core having opposing ends connected by a middle portion;

a coil wound around the middle portion and having leads for supplying current to a load external to the tool housing, where both the inductor core and coil are configured to be arced between the opposing ends about the axis of rotation of the rotor, and the inductor core is configured to provide a consistent gap between the face of the inductor core and the face of each magnet while each magnet is being rotated between positions proximal the opposing ends, the inductor core having a length to enable its opposing ends to each be simultaneously radially aligned with a respective magnet in the rotor to complete a magnetic circuit through the inductor core.

21. The stator of claim 20, wherein the opposing ends of the inductor core are each wider than the middle portion, and have substantially the same surface area as the magnets thereby to receive the magnetic field from the magnets when proximal.

22. A tool cover for receiving a tool housing of a tool, the tool cover supporting and aligning an inductor element of a stator with magnets of a rotor within the tool housing, the tool cover also supporting a circuit to which the inductor element is electrically connected.

23. A cover for a tool, comprising:

a body dimensioned to receive a tool housing of the tool and to permit access to an actuating lever on the tool housing;

a stator in the body adjacent to the tool housing, the stator cooperating with magnets on a rotor within the tool housing to generate electricity in the stator when the rotor is caused to rotate in response to flow of pressurized fluid through the tool housing.

24. A cover for a tool, comprising:

a body dimensioned to receive a tool housing of the tool and to permit access to an actuating lever on the tool housing, the body having a surface area for receiving a flexible conductive substrate to form a printed circuit;

a cavity in the body adjacent to the tool housing, the cavity dimensioned to receive a stator;

wherein the stator is for cooperating with magnets on a rotor within the tool housing to generate electricity in the stator when the rotor is caused to rotate in response to flow of pressurized fluid through the tool housing.

* * * * *